US011257056B2

(12) United States Patent
Mori

(10) Patent No.: US 11,257,056 B2
(45) Date of Patent: Feb. 22, 2022

(54) PURCHASE SUPPORT DEVICE AND STORE SYSTEM INCLUDING THE SAME

(71) Applicant: TOSHIBA TEC KABUSHIKI KAISHA, Tokyo (JP)

(72) Inventor: Haruki Mori, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 74 days.

(21) Appl. No.: 16/742,316

(22) Filed: Jan. 14, 2020

(65) Prior Publication Data

US 2020/0234262 A1    Jul. 23, 2020

(30) Foreign Application Priority Data

Jan. 21, 2019 (JP) ............... JP2019-007576

(51) Int. Cl.
G06Q 30/02 (2012.01)
G06Q 20/20 (2012.01)

(52) U.S. Cl.
CPC ......... *G06Q 20/20* (2013.01); *G06Q 30/0207* (2013.01)

(58) Field of Classification Search
CPC ..................................................... G06Q 30/02
See application file for complete search history.

(56) References Cited

U.S. PATENT DOCUMENTS 10,762,309 B2 * 9/2020 Roth ............... G07G 1/009
10,949,910 B2 * 3/2021 Carpenter ......... G06Q 30/0255
2006/0289637 A1 12/2006 Brice et al.

(Continued)

FOREIGN PATENT DOCUMENTS

JP      H05352730 B1 * 11/2013 ............... G07G 1/14
JP      2016-57883 A    4/2016
KR      2015-0080600 A *  7/2015 ............ G06Q 30/06

OTHER PUBLICATIONS

Sudipta Ranjan Subudhi; R.N. Ponnalagu, An Intelligent shopping Cart with Automatic Product Detection and Secure Payment System (English), 2019 IEEE 16th India Council International Coference (INDICON) (pp. 1-4), Dec. 1, 2019 (Year: 2019).*

(Continued)

*Primary Examiner* — Marilyn G Macasiano
(74) *Attorney, Agent, or Firm* — Kim & Stewart LLP

(57) ABSTRACT

A purchase support device includes a communication section configured to communicate with an information terminal to receive purchaser identification information, data related to commodities to be purchased, and a settlement declaration that indicates whether or not settlement of the commodities to be purchased has initiated, a first memory region in which the purchaser identification information is stored in association with terminal identification information, a second memory region in which data related to the commodities to be purchased is stored in association with the purchaser identification information, and a processor. The processor is configured to issue, upon determining that the settlement declaration indicates that the settlement of commodities to be purchased has initiated, a disabling command through the communication section to another information terminal, wherein the disabling command causes said another information terminal to disable acceptance of additional data related to commodities to be purchased.

6 Claims, 18 Drawing Sheets

(56) References Cited

U.S. PATENT DOCUMENTS

| | | | |
|---|---|---|---|
| 2008/0308630 A1* | 12/2008 | Bhogal | G07G 1/0081 |
| | | | 235/383 |
| 2012/0226556 A1* | 9/2012 | Itagaki | B62B 3/1416 |
| | | | 705/14.64 |
| 2014/0001258 A1* | 1/2014 | Chan | G06Q 10/0875 |
| | | | 235/385 |

OTHER PUBLICATIONS

Method to Audit one Basket with Multiple Mobile Transaction (English (Unites States)), The IP.com Prior Art Database), May 18, 2020 (Year: 2020).*

* cited by examiner

| MEMBER ID | |
| --- | --- |
| COMMODITY DATA | k |
| COMMODITY DATA | k |
| COMMODITY DATA | k |
| ⋮ | |
| DISCOUNT TOTAL AMOUNT | |
| TOTAL AMOUNT | |
| SETTLEMENT BARCODE | |

PURCHASE SUPPORT DEVICE AND STORE SYSTEM INCLUDING THE SAME

CROSS-REFERENCE TO RELATED APPLICATION

This application is based upon and claims the benefit of priority from Japanese Patent Application No. 2019-007576, filed Jan. 21, 2019, the entire contents of which are incorporated herein by reference.

FIELD

Embodiments described herein relate generally to a purchase support device, a store system including the purchase support device, and a control program for causing a computer to function as the purchase support device.

BACKGROUND

In recent years, a store system called cart POS (Point Of Sales) system or the like has been proposed for retail stores equipped with shopping carts. In the store system of this type, an information terminal including a touch panel and a scanner is provided in the shopping cart. When placing commodities to be purchased on the shopping cart, a customer using the shopping cart causes the scanner to read identification codes of the commodities and performs commodity registration. Data of the commodities registered in the information terminal is transmitted to a server. The server creates, based on the data of the commodities registered in the information terminal, a commodity list of the customer using the information terminal. The customer who has finished shopping inputs a settlement instruction into the information terminal. In response to the settlement instruction, the information terminal transfers the commodity list of the customer using the information terminal to a settlement machine. The customer performs settlement in the settlement machine based on the commodity data. Consequently, settlement of the registered commodities of the customer is completed.

In such a store system, a customer visiting a store in a group such as a family uses two or more shopping carts. In this case, the server only needs to collectively manage data of commodities registered in information terminals respectively provided in the shopping carts and create a single commodity list. However, after one of members of the group enters a settlement instruction into an information terminal provided in one shopping cart, even if another member causes a scanner of an information terminal provided in another shopping cart to read an identification code of a commodity, since the commodity list has already been transferred to the settlement machine, the commodity is likely not included in the commodity list.

Such a problem can be prevented by prohibiting commodity registration from an information terminal if a settlement instruction has been input from another information terminal of the same group. However, a suitable technique for preventing this has not been established yet.

DESCRIPTION OF THE DRAWINGS

FIG. 6 is a schematic diagram illustrating an example of a shopping basket memory of the virtual POS server;

FIG. 20 is a schematic diagram illustrating an example of the registration screen for linkage displayed on the touch panel of the information terminal;

FIG. 21 is a schematic diagram illustrating an example of a confirmation image displayed on the touch panel of the information terminal;

DETAILED DESCRIPTION

Embodiments provide a purchase support device that can prohibit commodity registration from an information terminal, if a settlement instruction has been input into an information terminal of another customer of the same group, a store system in which the purchase support device is used, and a computer program for causing a computer to function as the purchase support device.

In an embodiment, a purchase support device includes a communication section configured to communicate with an information terminal that has accepted purchaser identification information for identifying a purchaser, data related to commodities to be purchased by the purchaser, and a settlement declaration that indicates whether or not settlement of the commodities to be purchased has initiated, and communicated the purchaser identification information, the data related to the commodities to be purchased, and the settlement declaration to the communication section, a first memory region in which the purchaser identification information is stored in association with terminal identification information for identifying the information terminal, a second memory region in which data related to the commodities to be purchased is stored in association with the purchaser identification information, and a processor. The processor is configured to issue, upon determining that the settlement declaration indicates that the settlement of commodities to be purchased has initiated, a disabling command through the communication section to another information terminal that has accepted the purchaser identification information stored in the first memory region in association with the terminal identification information of the information terminal, wherein the disabling command causes said another information terminal to disable acceptance of additional data related to commodities to be purchased by the purchaser.

An embodiment of a purchase support device that can prohibit commodity registration from an information terminal, if a settlement instruction has been input into an information terminal of another member of the same group, is explained below with reference to the drawings. In detail, an embodiment for causing a server of a store system that implements the so-called cart POS system, to function as the purchase support device is explained with reference to FIGS. 1 to 23.

Figure 1:
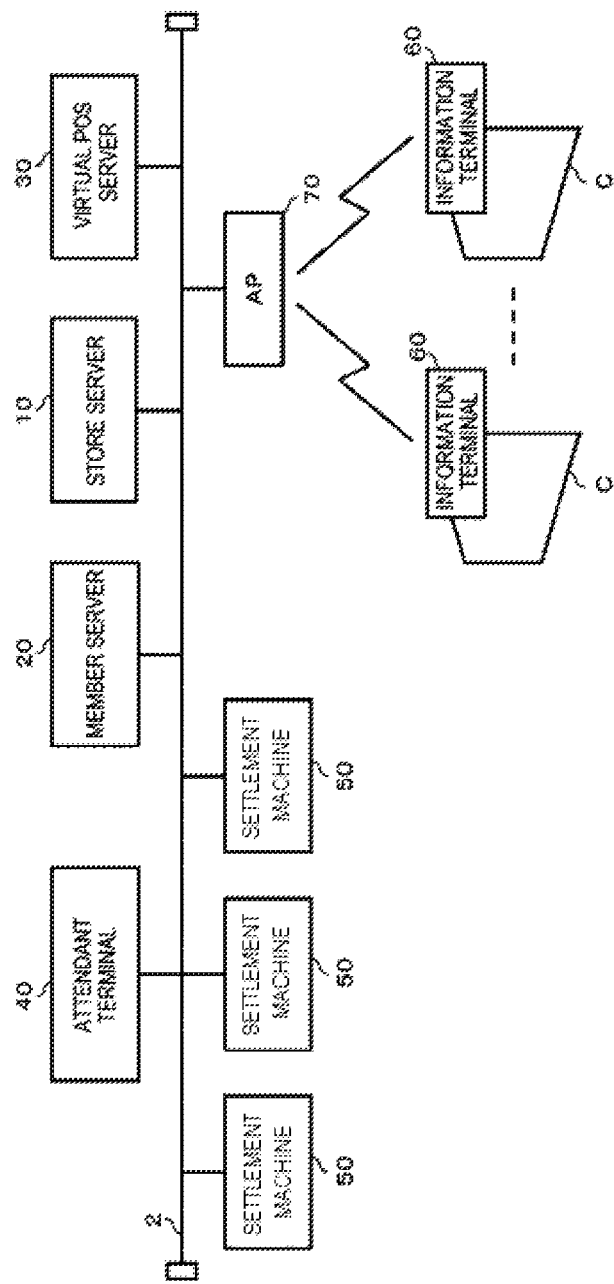
FIG. 1 is an overall configuration diagram of a cart POS system according to an embodiment.

FIG. 1 is an overall configuration diagram of a cart POS system 1 according to an embodiment. The cart POS system 1 includes a store server 10, a member server 20, a virtual POS server 30 (e.g., a physical server that is configured to perform some or all of the functions of a POS terminal), an attendant terminal 40, settlement machines 50, information terminals 60, and an access point (AP) 70. The cart POS system 1 includes a network 2. The network 2 communicably connects the store server 10, the member server 20, the virtual POS server 30, the attendant terminal 40, the settlement machines 50, and the access point 70. The network 2 is, for example, a LAN (Local Area Network).

The information terminal 60 is a device that enables a customer, who is a purchaser, to perform input of data related to registration of commodities to be purchased in a self-service manner. The information terminal 60 is provided in a shopping cart C. In the following explanation, the shopping cart C is simply referred to as cart C. The cart C is an example of a conveying body that conveys commodities selected for purchase by a customer, who is a user of the cart C.

The information terminal 60 includes a wireless unit. The information terminal 60 performs wireless communication with the access point 70. The access point 70 relays communication between the devices connected to the network 2, that is, the store server 10, the member server 20, the virtual POS server 30, the attendant terminal 40, and the settlement machines 50 and the information terminal 60. Only one access point 70 is illustrated in FIG. 1. However, two or more access points 70 may be present depending on a size or the like of a store.

The store server 10 supports purchases made by customers in a store. For support, the store server 10 manages commodity database, a sales database, and the like. The commodity database saves a commodity record describing commodity data for each of commodities sold in the store. The commodity data includes a commodity code, a price, and a commodity name. The commodity code is an identification code of the commodity. The sales database saves a sales record describing sales data for each of items such as a commodity, a department, a time period, a date, a week, and a month. The sales data includes the number of sold items and a sales amount.

The member server 20 supports a purchasing acts of a customer registered as a member. For support, the member server 20 manages a member database. The member database saves a member record describing member data for each of members. The member data includes a unique member ID allocated to each of members in order to individually identify the members. The member data may include a cumulative value of a service point given to the member and a history of commodities purchased by the member.

The virtual POS server 30 provides one or more functions of a POS terminal in response to requests from the information terminal 60. Incidentally, in this embodiment, the virtual POS server 30 functions as the purchase support device.

The attendant terminal 40 is provided in an attendant counter where a watchman, a so-called attendant, is stationed. The attendant terminal 40 includes a display device for displaying states of the information terminals 60 and the settlement machines 50. The attendant monitors the states of the information terminals 60 and the settlement machines 50 on a real-time basis from information displayed on the display device.

The settlement machine 50 is a device that enables a store clerk or a customer to perform settlement of commodities selected for purchase. The settlement machine 50 is a well-known self-type POS terminal. The settlement machine 50 may be a well-known facing-type POS terminal. The number of the settlement machines 50 is not particularly limited any one number. In FIG. 1, the cart POS system 1 in which three settlement machines 50 are set in one store is illustrated.

Figure 2:
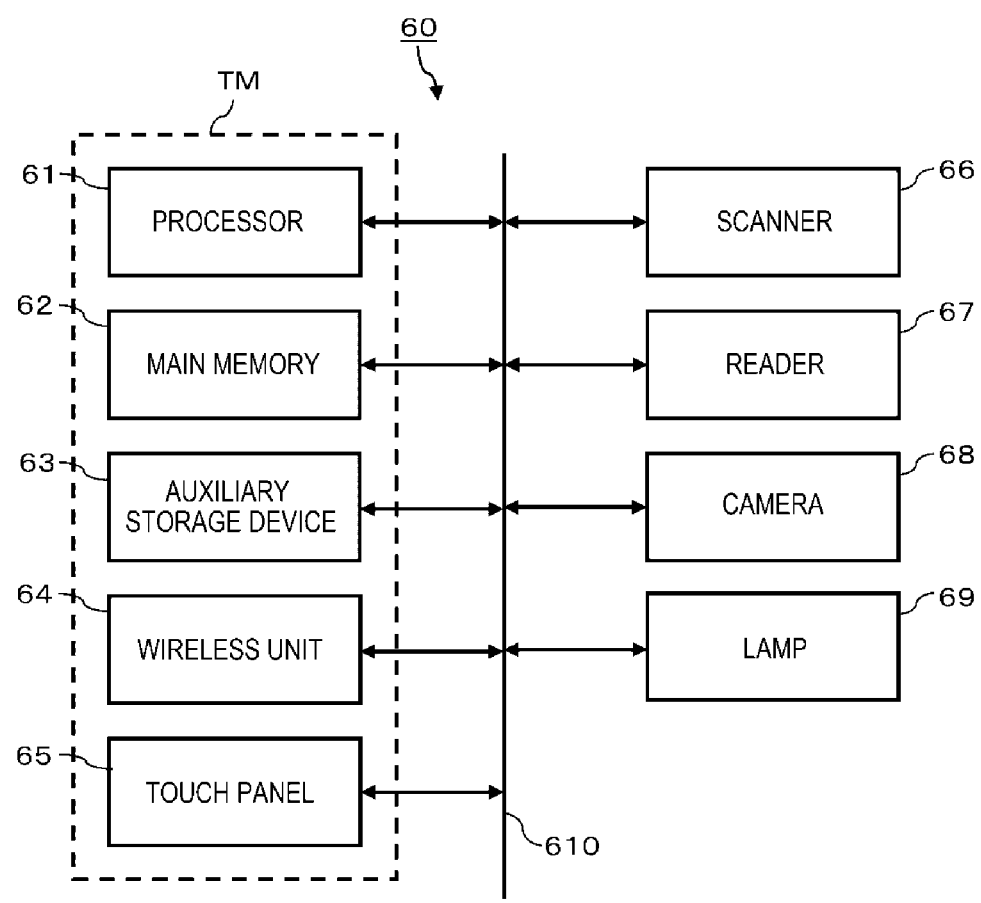
FIG. 2 is a block diagram illustrating a circuit configuration of an information terminal of the cart POS system.

FIG. 2 is a block diagram illustrating a circuit configuration of the information terminal 60. The information terminal 60 includes a processor 61, a main memory 62, an auxiliary storage device 63, a wireless unit 64, a touch panel 65, a scanner 66, a reader 67, a camera 68, a lamp 69, and a system transmission line 610. The system transmission line 610 includes an address bus, a data bus, and a control signal line. In the information terminal 60, the processor 61, the main memory 62, the auxiliary storage device 63, the wireless unit 64, the touch panel 65, the scanner 66, the reader 67, the camera 68, and the lamp 69 are connected to the system transmission line 610. In the information terminal 60, a computer is configured by the processor 61, the main memory 62, and the auxiliary storage device 63 and the system transmission line 610 that connects these devices.

The processor 61 is a central part of the computer. The processor 61 controls the sections according to an operating system or application programs in order to realize various functions of the information terminal 60. The processor 61 is, for example, a CPU (Central Processing Unit).

The main memory 62 is a main storage portion of the computer. The main memory 62 includes a nonvolatile memory region and a volatile memory region. The main memory 62 stores the operating system or the application programs in the nonvolatile memory region. The main memory 62 sometimes stores, in the nonvolatile or volatile memory region, data necessary for the processor 61 to execute processing for controlling the sections. The main memory 62 uses the volatile memory region as a work area where data is rewritten as appropriate by the processor 61. The nonvolatile memory region is, for example, a ROM (Read Only Memory). The volatile memory region is, for example, a RAM (Random Access Memory).

The auxiliary storage device 63 is an auxiliary storage portion of the computer. For example, an EEPROM (Electric Erasable Programmable Read-Only Memory), a HDD (Hard Disc Drive), or an SSD (Solid State Drive) can be the auxiliary storage device 63. The auxiliary storage device 63 saves data used by the processor 61 in performing various kinds of processing, data created by the processing in the processor 61, or the like. The auxiliary storage device 63 sometimes may store the application programs.

The wireless unit 64 is, for example, a wireless interface circuit, and performs wireless communication of data with the access point 70 according to a wireless communication protocol.

The touch panel 65 is a device functioning as both of an input device and a display device of the information terminal 60. The touch panel 65 detects a touch position on a displayed image and outputs information concerning the touch position to the processor 61.

The scanner 66 reads a code symbol such as a barcode or a two-dimensional data code attached to a commodity. A code symbol representing a commodity code of the commodity is attached to the commodity. The scanner 66 outputs data of the read code symbol to the processor 61. The scanner 66 may be a type for reading the code symbol by scanning laser beam or may be a type for reading the code symbol from an image captured by an imaging device.

The reader 67 reads data recorded in a recording medium and outputs the read data to the processor 61. The following are some examples of the reader 67. If the recording medium is a magnetic card, the reader 67 is a magnetic card reader. If the recording medium is a contact IC card, the reader 67 is an IC card reader. In the case of a recording medium in which an RFID (Radio Frequency Identification) is used such as a noncontact IC card or a smartphone, an RFID reader is used as the reader 67.

The camera 68 is provided in the cart C to be able to photograph, from above, a basket placed on a basket receiving section of the cart C. The camera 68 is a camera for monitoring whether a customer, who is a user of the cart C, correctly puts a commodity in the basket.

The lamp 69 is a lamp for informing a state of the cart C to the customer or the store clerk. For example, if a group customer is using a plurality of carts C, the lamps 69 provided in the respective carts C are lit or flashed to inform people around the carts C that the carts C are used by the group customer. At this time, the lamps 69 are desirably lit or flashed in a different color for each group to enable the group to be identified.

The processor 61, the main memory 62, the auxiliary storage device 63, the wireless unit 64, and the touch panel 65 of the information terminal 60 are parts of a tablet terminal TM. The scanner 66, the reader 67, the camera 68, and the lamp 69 are electrically connected to the tablet terminal TM.

Figure 3:
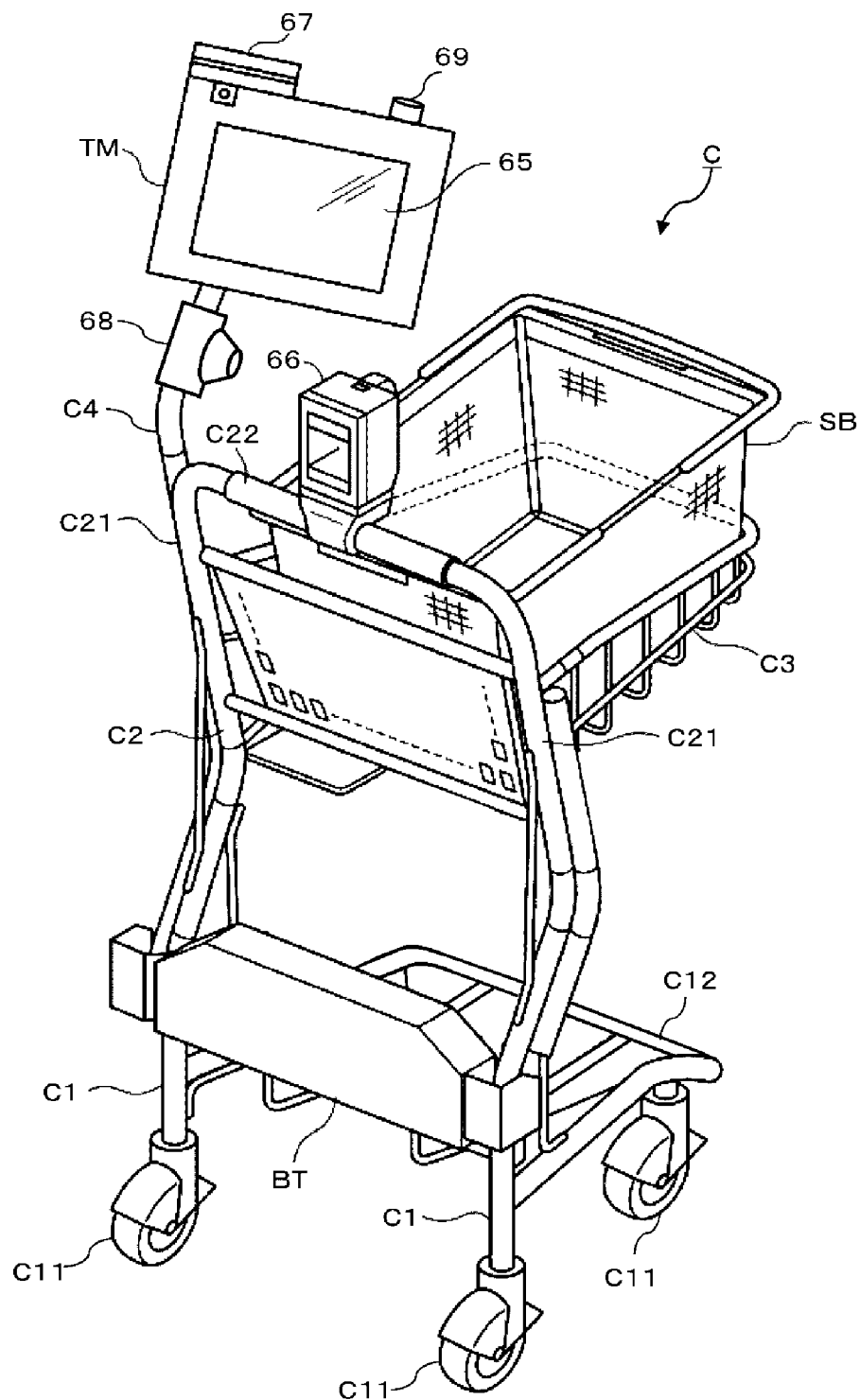
FIG. 3 is a perspective view illustrating an example of a cart in which the information terminal is provided.

FIG. 3 is a perspective view illustrating an example of the cart C in which the information terminal 60 is provided. The cart C includes a caster section C1 for movement, a handle frame section C2, and a basket receiving section C3. The caster section C1 includes four wheels C11 for smoothly moving the cart C on a floor surface. The caster section C1 includes a receiving section C12 for placing large baggage that cannot be put in a shopping basket SB. The handle frame section C2 includes a pair of vertical frames C21 and C21 erected on a rear wheel side of the caster section C1 and a handlebar C22 that couples the upper ends of the vertical frames C21 and C21. The basket receiving section C3 is present in the front from a halfway part of the handle frame section C2. In the cart C, the shopping basket SB equipped in the store can be placed on the basket receiving section C3. The shopping basket SB is a basket for storing commodities.

The scanner 66 is present in a middle part of the handle bar C22, approximately halfway from left and right sides of the handle bar C22. The scanner 66 is attached to the handlebar C22 to locate a reading window on the near side. The near side is a side where a customer holding the handlebar C22 and pushing the cart C stands.

Figure 5:
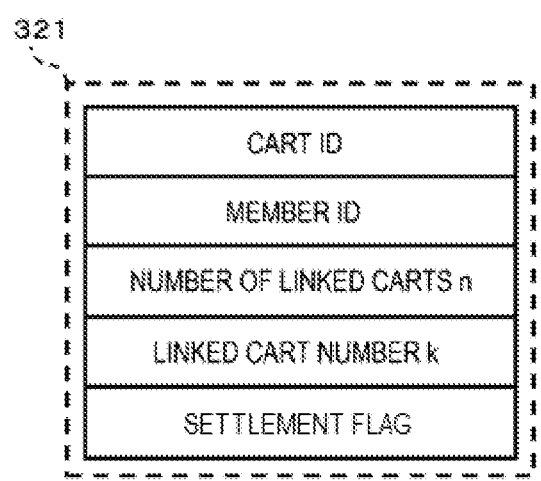
FIG. 5 is a schematic diagram illustrating an example of a cart memory of the virtual POS server.

A pole C4 is attached to one vertical frame C21. The tip of the pole C4 is located above the handlebar C22. The tablet terminal TM is attached to the tip portion of the pole C4 with a screen of the touch panel 65 placed in the near side. The reader 67 is attached to a frame of the tablet terminal TM to locate a cart slit on the near side. In FIG. 5, the reader 67 is a magnetic card reader. The camera 68 is attached to a halfway part of the pole C4 to image, from above, the entire shopping basket SB placed on the basket receiving section C3. Like the reader 67, the lamp 69 is provided in the frame of the tablet terminal TM. An attachment part of the lamp 69 is not limited to the frame of the tablet terminal TM. For example, the lamp 69 may be attached to a part of the pole C4. Alternatively, the lamp 69 may be attached to an upper part of the scanner 66.

The battery BT is attached between the vertical frames C21 and C21 on the lower end side of the handle frame section C2. The battery BT is a driving power supply for the tablet terminal TM, the scanner 66, the reader 67, the camera 68, and the lamp 69.

Figure 4:
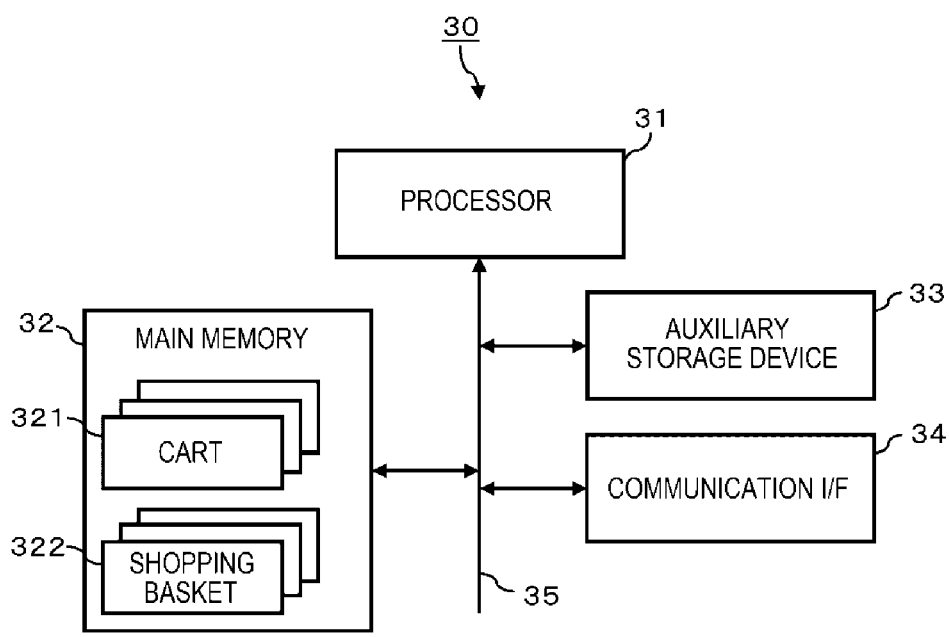
FIG. 4 is a block diagram illustrating a circuit configuration of a virtual POS server of the cart POS system.

FIG. 4 is a block diagram illustrating a circuit configuration of the virtual POS server 30. The virtual POS server 30 includes a processor 31, a main memory 32, an auxiliary storage device 33, a communication interface 34, and a system transmission line 35. The system transmission line 35 includes an address bus, a data bus, and a control signal line. In the virtual POS server 30, the processor 31, the main memory 32, the auxiliary storage device 33, and the communication interface 34 are connected to the system transmission line 35. In the virtual POS server 30, a computer is configured by the processor 31, the main memory 32, and the auxiliary storage device 33 and the system transmission line 35 that communicatively connects these devices to each other.

The processor 31 is a central part of the computer. The processor 31 controls the sections according to an operating system or application programs in order to realize various functions of the virtual POS server 30. The processor 31 is, for example, a CPU.

The main memory 32 is a main storage portion of the computer. The main memory 32 includes a nonvolatile memory region and a volatile memory region. The main memory 32 stores the operating system or the application programs in the nonvolatile memory region. The main memory 32 sometimes stores, in the nonvolatile or volatile memory region, data necessary for the processor 31 to execute processing for controlling the sections. The main memory 32 uses the volatile memory region as a work area where data is rewritten as appropriate by the processor 31. The nonvolatile memory region is, for example, a ROM. The volatile memory region is, for example, a RAM.

The auxiliary storage device 33 is an auxiliary storage portion of the computer. For example, an EEPROM, a HDD, or an SSD can be the auxiliary storage device 33. The auxiliary storage device 33 saves data used by the processor 31 in performing various kinds of processing, data created by the processing in the processor 31, or the like. The auxiliary storage device 33 sometimes may store the application programs.

The communication interface 34 is connected to the network 2. The communication interface 34 is controlled by the processor 31 to perform, according to a communication protocol, data communication with other devices connected via the network 2. The processor 31 cooperates with the communication interface 34 to configure a communication section that performs communication with the information terminal 60.

In the virtual POS server 30 having such a configuration, a part of the volatile memory region of the main memory 32 is a region where a cart memory 321 and a shopping basket memory 322 are set up. The virtual POS server 30 can set up a plurality of cart memories 321 and a plurality of shopping basket memories 322 in this region.

FIG. 5 is a schematic diagram illustrating an example of the cart memory 321. As illustrated in FIG. 5, the cart memory 321 includes regions for respectively storing a cart ID, a member ID, the number of linked carts n, a linked cart number k, and a settlement flag. The cart ID is a unique code allocated to each cart in order to individually identify the carts C. In the main memories 62 or the auxiliary storage devices 63 of the information terminals 60 respectively provided in the carts C, cart IDs of the carts C in which the information terminals 60 are provided are stored. The number of linked carts n is the number of carts C in use if a group customer such as a family uses a plurality of carts C. If the customer uses only one cart C, the number of linked carts of the cart memory 321 including a cart ID of the cart C is "1". If a group customer such as a family uses a plurality of carts C, the linked cart number k is a series of numbers respectively allocated to the carts C in order to identify the plurality of carts C. The linked cart number k is a natural number from an initial value 1 to the number of linked carts n. However, if a customer uses only one cart C, the linked cart number k is "0". The settlement flag is one-bit information for identifying whether the customer using the cart C identified by the cart ID performs a settlement declaration. In this embodiment, the settlement flag is reset to "0" in a state in which the settlement declaration is not performed. The settlement flag is set to "1" if the settlement declaration is performed.

FIG. 6 is a schematic diagram illustrating an example of the shopping basket memory 322. As illustrated in FIG. 6, the shopping basket memory 322 includes regions for respectively storing a member ID, one or a plurality of commodity data, a discount total amount, a total amount, and a settlement barcode. The commodity data includes a commodity code, a commodity name, a price, the number of items, a sales amount, and a tax amount of a commodity to be purchased by a customer. The discount total amount is a total of discount amounts calculated from the commodity data if a set discount is included. The total amount is an amount calculated by subtracting the discount total amount from a total of the sales amount and the tax amount included in the commodity data. The settlement barcode is a barcode converted from a unique code generated for each transaction in order to associate a transaction with a customer. The linked cart number k set in the information terminal 60, in which the commodity is registered, is added to the commodity data.

FIGS. 7 to 11 are flowcharts illustrating a procedure of main information processing executed by the processor 61 of the information terminal 60 according to a terminal program. The terminal program is stored in the main memory 62 or the auxiliary storage device 63. FIGS. 12 to 16 are flowcharts illustrating a procedure of information processing specified in a control program and executed by the processor 31 of the virtual POS server 30 according to reception of a main command transmitted from the information terminal 60. The control program is stored in the main memory 32 or the auxiliary storage device 33. FIG. 17 is a flowchart illustrating a procedure of information processing specified in a control program and executed by the processor 31 of the virtual POS server 30 according to reception of a scanner command transmitted from the settlement machine 50.

In the following explanation, a main operation performed by the cart POS system 1 from when a customer visiting a store in a group such as a family uses a plurality of carts C and performs registration of commodities until when the customer performs settlement in the settlement machine 50 is explained with reference to these flowcharts. The operation explained below is an example. A procedure of the operation is not particularly limited to the example if the same result can be obtained by other examples.

<Cart Linkage Operation>

First, an operation for a customer visiting a store in a group, a so-called group customer, to link and use a plurality of carts C is explained.

For example, in order to link and use two carts C01 and C02, the group customer needs to perform, with the same member ID, login to information terminals 60A and 60B provided in the respective carts C01 and C02. Therefore, first, the group customer touches the touch panels 65 of the information terminal 60A and the information terminal 60B respectively provided in the cart C01 and the cart C02. The information terminal 60A corresponds to the information terminal 60 provided in the cart C01. The information terminal 60B corresponds to the information terminal 60 provided in the cart C02.

In the information terminal 60A or the information terminal 60B, if the touch panel 65 is touched, the processor 61 in an idle state starts. The processor 61 starts the information processing of the procedure illustrated in the flowchart of FIG. 7.

First, in Act 101, the processor 61 causes the touch panel 65 to display a login screen. The login screen is a screen for accepting login operation. One person of the group customer carries a member card in which a member ID is recorded. The group customer confirms the login screen and causes the readers 67 of the information terminal 60A and the information terminal 60B to read data of the same member card. If the data of the member card is read by the readers 67, in the information terminal 60A and the information terminal 60B, the data of the member card is given to the processors 61.

In Act 102, the processor 61, which causes the touch panel 65 to display the login screen, waits for login. When confirming that the data read by the reader 67 is the data of the member card including the member ID, the processor 61 recognizes that login is performed. That is, the processor 61 determines YES in Act 102 and proceeds to Act 103.

In Act 103, the processor 61 acquires a cart ID from the main memory 62 or the auxiliary storage device 63. In Act 104, the processor 61 controls the wireless unit 64 to output a login command to the virtual POS server 30. According to this control, the wireless unit 64 wirelessly transmits the login command. The login command is received by the access point 70 and transmitted to the virtual POS server 30 through the network 2. The login command includes the member ID of the member card read by the reader 67 and the cart ID acquired in the processing in Act 103.

Figure 7:
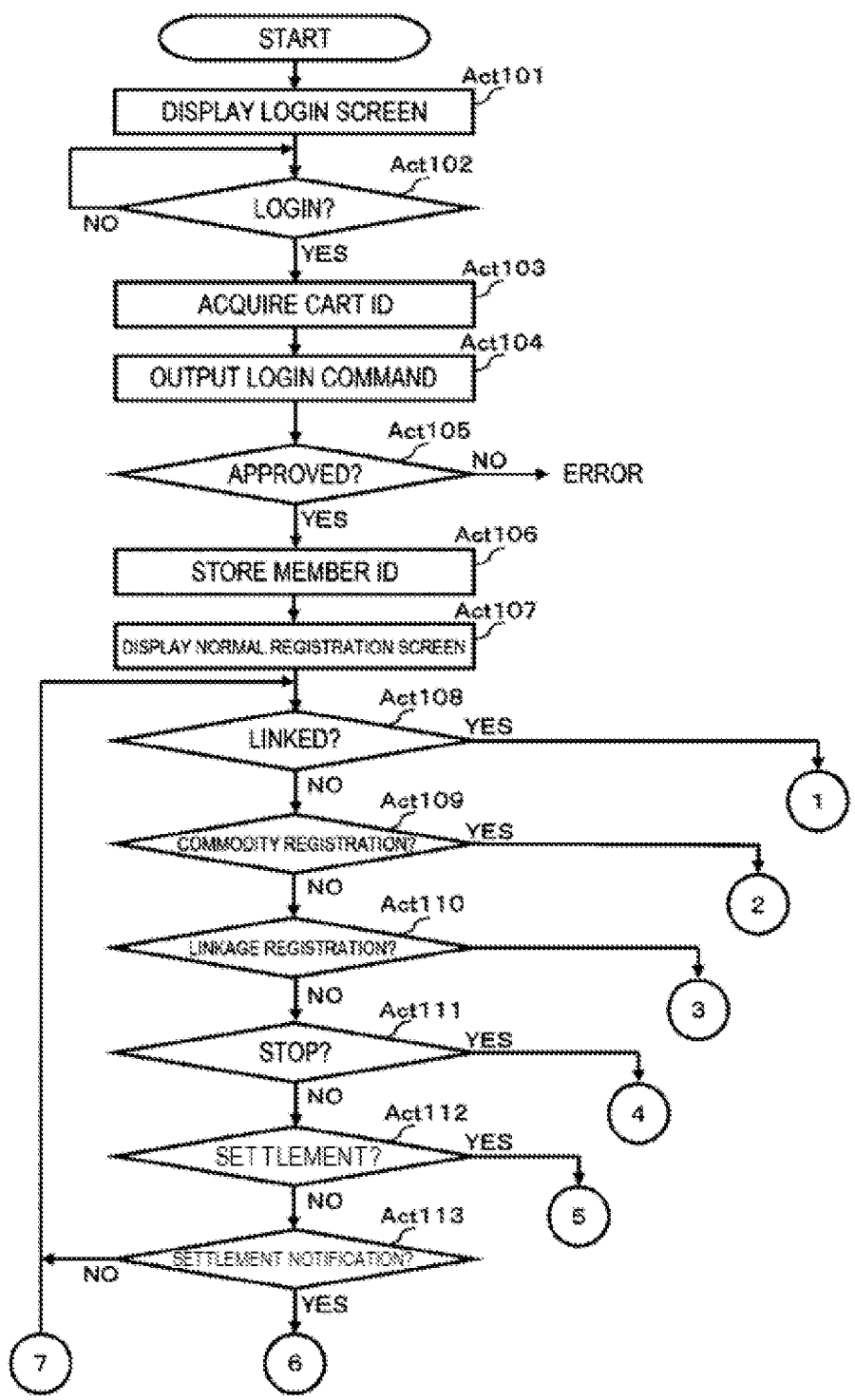
FIG. 7 is a flowchart illustrating a procedure of main information processing executed by a processor of the information terminal.

The processor 61 of the information terminal 60 executes the processing in Act 101 to Act 104 in FIG. 7 to function as a purchaser accepting section that accepts purchaser identification information for identifying a purchaser, that is, a member ID.

If a command is received from the information terminal 60 via the communication interface 34, the processor 31 of the virtual POS server 30 confirms a type of the command. If the received command is a login command, the processor 31 starts login command reception processing of the procedure illustrated in the flowchart of FIG. 12.

In Act 201, the processor 31 acquires a cart ID from the login command. In Act 202, the processor 31 determines whether the cart memory 321 in which the cart ID is stored, is already set up. In the following explanation, the cart memory 321 in which a cart ID set in the information terminal 60A of the first cart C01 is stored, is represented as a cart memory 321A. If the cart memory 321A is already set up, the processor 31 determines YES in Act 202 and proceeds to Act 215. In Act 215, the processor 31 controls the communication interface 34 to output a denial response command addressed to the cart ID acquired from the login command. According to this control, the communication interface 34 transmits the denial response command to the network 2.

If the cart memory 321A is not set up yet, the processor 31 determines NO in Act 202 and proceeds to Act 203. In Act 203, the processor 31 sets up the cart memory 321A in a predetermined region of the main memory 32. The processor 31 stores the cart ID acquired from the login command in the cart memory 321A.

In Act 204, the processor 31 acquires a member ID from the login command. In Act 205, the processor 31 performs authentication of a member identified by the member ID. Specifically, the processor 31 inquires the member server 20 whether a member record including the member ID is present in the member database. As a result, if a response indicating that the pertinent member record is present in the member database is received from the member server 20, the processor 31 recognizes that the member authentication is effective. If a response indicating that the pertinent member record is absent in the member database is received from the member server 20, the processor 31 recognizes that the member authentication is ineffective.

In Act 206, the processor 31, which performs the member authentication, confirms an authentication result of the member authentication. If the authentication result is "ineffective", in Act 206, the processor 31 determines NO in Act 206 and proceeds to Act 215 explained above. That is, the processor 31 controls the communication interface 34 to output a denial response command addressed to the cart ID acquired from the login command.

If the authentication result is "effective", the processor 31 determines YES in Act 206 and proceeds to Act 207. In Act 207, the processor 31 searches for a region where the cart memory 321 is set up in the main memory 32. In Act 208, the processor 31 determines presence or absence of overlap of the member ID. That is, the processor 31 determines whether the cart memory 321 in which the member ID acquired from the login command is stored, is present other than the cart memory 321A. In the following explanation, the cart memory 321 in which the member ID acquired from the login command is stored, other than the cart memory 321A is represented as a cart memory 321B.

If no cart memory 321B is present, there is no overlap of the member ID. In this case, the processor 31 determines NO in Act 208 and proceeds to Act 209. In Act 209, the processor 31 sets up the shopping basket memory 322 in a predetermined region of the main memory 32. The processor 31 stores the member ID acquired from the login command in the shopping basket memory 322. Thereafter, in Act 210, the processor 31 controls the communication interface 34 to output an approval response command addressed to the cart ID acquire from the login command. According to this control, the communication interface 34 transmits the approval response command to the network 2.

As a result of searching for the region where the cart memory 321 is set up, if confirming that the cart memory 321B is present, the processor 31 determines YES in Act 208 and proceeds to Act 211. In Act 211, the processor 31 controls the communication interface 34 to output an approval response command addressed to the cart ID acquired from the login command. That is, if one or more cart memories 321B are present, the processor 31 controls the output of the approval response command without setting up the shopping basket memory 322.

If ending the processing in Act 211, in Act 212, the processor 31 sets a total number of the cart memories 321A and the cart memories 321B as the number of linked carts n. The processor 31 stores the number of linked carts n respectively in the cart memories 321A and the cart memories 321B. In Act 213, the processor 31 allocates linked cart numbers k from an initial value "1" to the number of linked carts n one by one to the cart memories 321A and the cart memories 321B. The linked cart numbers k may be allocated in any manner. For example, if one cart memory 321A and one cart memory 321B are present, the processor 31 allocates "1" to the cart memory 321A as the linked cart number k and allocates "2" to the cart memory 321B as the linked cart number k. The linked cart numbers k also may be allocated in the opposite manner.

If the processing in Act 212 and Act 213 is ended, in Act 214, the processor 31 controls the communication interface 34 to output a linkage command addressed to cart IDs stored respectively in the cart memory 321A and the cart memory 321B. According to this control, the communication interface 34 transmits linkage commands as many as the number of linked carts n to the network 2.

If the processing in Act 214 is ended in this manner or the processing in Act 210 or Act 215 is ended as explained above, the processor 31 ends the login command reception processing.

In this manner, the login command reception processing is executed in the virtual POS server 30 and, if the login is denied, the denial response command is output. The denial response command is wirelessly transmitted from the access point 70 via the network 2. The denial response command is received by the information terminal 60 at the login command transmission source.

If the login is approved in the virtual POS server 30, the approval response command is output. The approval response command is wirelessly transmitted from the access point 70 via the network 2. The approval response command is received by the information terminal 60 at the login command transmission source. The approval response command includes the member ID acquired in Act 204.

If the cart memory 321B in which the same member ID as the member ID stored in the cart memory 321A is stored, is present in the virtual POS server 30, linkage commands are output, the number of linkage commands being equal to the number of linked carts n. The linkage commands are wirelessly transmitted from the access point 70 via the network 2. One linkage command is received by the information terminal 60 at the login command transmission source. Another linkage command is received by the information terminal 60 provided in another cart C that is in a linked state with the cart C in which the information terminal 60 is provided. The linkage commands include the numbers of linked carts n and the linked cart numbers k of the cart memory 321A and the cart memory 321B in which the cart IDs to which the linkage commands are addressed are respectively stored.

Referring back to FIG. 7, in Act 105, the processor 61 of the information terminal 60, which controls the output of the login command in Act 104, waits for a response command from the virtual POS server 30. If a denial response command is received from the virtual POS server 30, in Act 105, the processor 61 determines NO and determines that the login is an error.

If the login is an error, the customer, who is an operator of the information terminal 60, performs operation for releasing the error from the touch panel 65. If the releasing operation is performed, the processor 61 resumes the processing from Act 1. Therefore, the customer performs login again.

In Act 105, if the approval response command is received from the virtual POS server 30, the processor 61 determines YES and proceeds to Act 106. In Act 106, the processor 61 stores the member ID included in the approval response command in the main memory 62. In Act 107, the processor 61 causes the touch panel 65 to display a normal registration screen SC1. The normal registration screen SC1 is a screen for displaying a commodity list of a commodity name, the number of items, a price, and the like and a total amount of commodities purchased by the customer.

Figure 18:
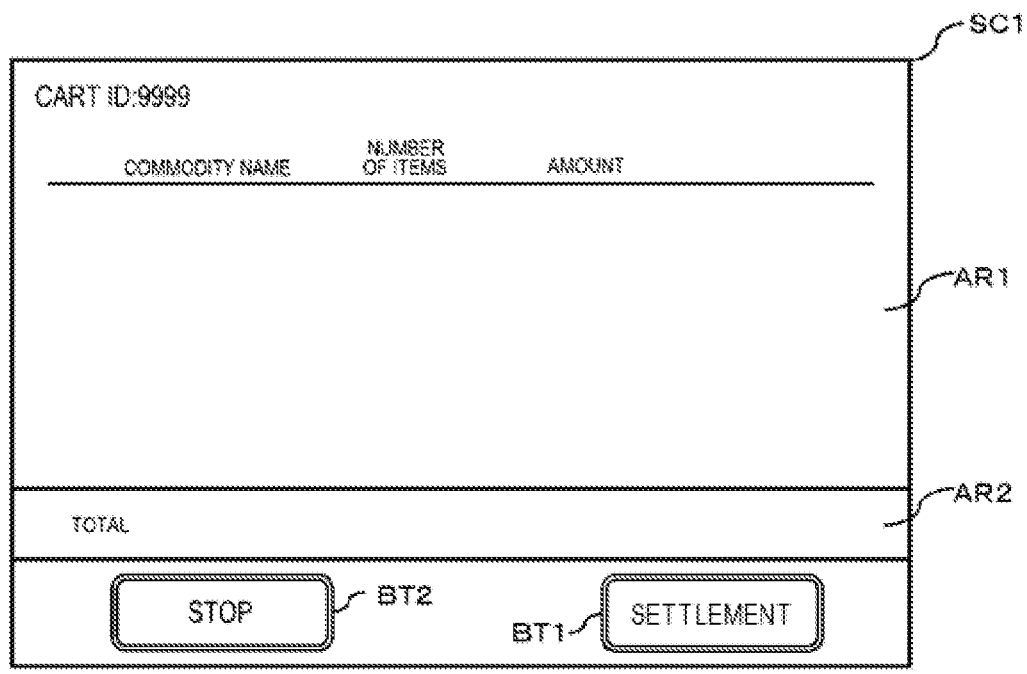
FIG. 18 is a schematic diagram illustrating an example of a normal registration screen displayed on a touch panel of the information terminal.

An example of the normal registration screen SC1 is illustrated in FIG. 18. As illustrated in FIG. 18, a display region AR1 for a commodity list and a display region AR2 for a total are formed on the normal registration screen SC1. Images of a settlement button BT1 and a stop button BT2 are displayed on a part of the normal registration screen SC1. If the customer instructs accounting, the customer touches the settlement button BT1. If the customer stops the use of the cart C, the customer touches the stop button BT2. Alternatively, if the customer uses the cart C but stops registration of a commodity using the information terminal 60, the customer touches the stop button BT2. Furthermore, a cart ID stored in the main memory 32 or the auxiliary storage device 33 is also displayed in an upper part of the normal registration screen SC1.

If the processing in Act 107 is ended, in Act 108, the processor 61 confirms whether the processor 61 receives a linkage command. If the linkage command is not received, the processor 61 determines NO in Act 108 and proceeds to Act 109. In Act 109, the processor 61 confirms whether commodity registration is performed. If commodity registration is not performed, the processor 61 determines NO in Act 109 and proceeds to Act 110. In Act 110, the processor 61 confirms whether the processor 61 receives a linkage registration command. The linkage registration command is explained below. If the linkage registration command is not received, the processor 61 determines NO in Act 110 and proceeds to Act 111. In Act 111, the processor 61 confirms whether the stop button BT2 is touched. If the stop button BT2 is not touched, the processor 61 determines NO in Act 111 and proceeds to Act 112. In Act 112, the processor 61 confirms whether the settlement button BT1 is touched. If the settlement button BT1 is not touched, the processor 61 determines NO in Act 112 and proceeds to Act 113. In Act 113, the processor 61 confirms whether the processor 61 receives a settlement notification command. The settlement notification command is explained below. If the settlement notification command is not received, the processor 61 determines NO in Act 113 and returns to Act 108.

In Act 108 to Act 113, the processor 61 waits for the linkage command to be received, the commodity registration to be performed, the linkage registration command to be received, the stop button BT2 to be touched, the settlement button BT1 to be touched, and the settlement notification command to be received.

Figure 12:
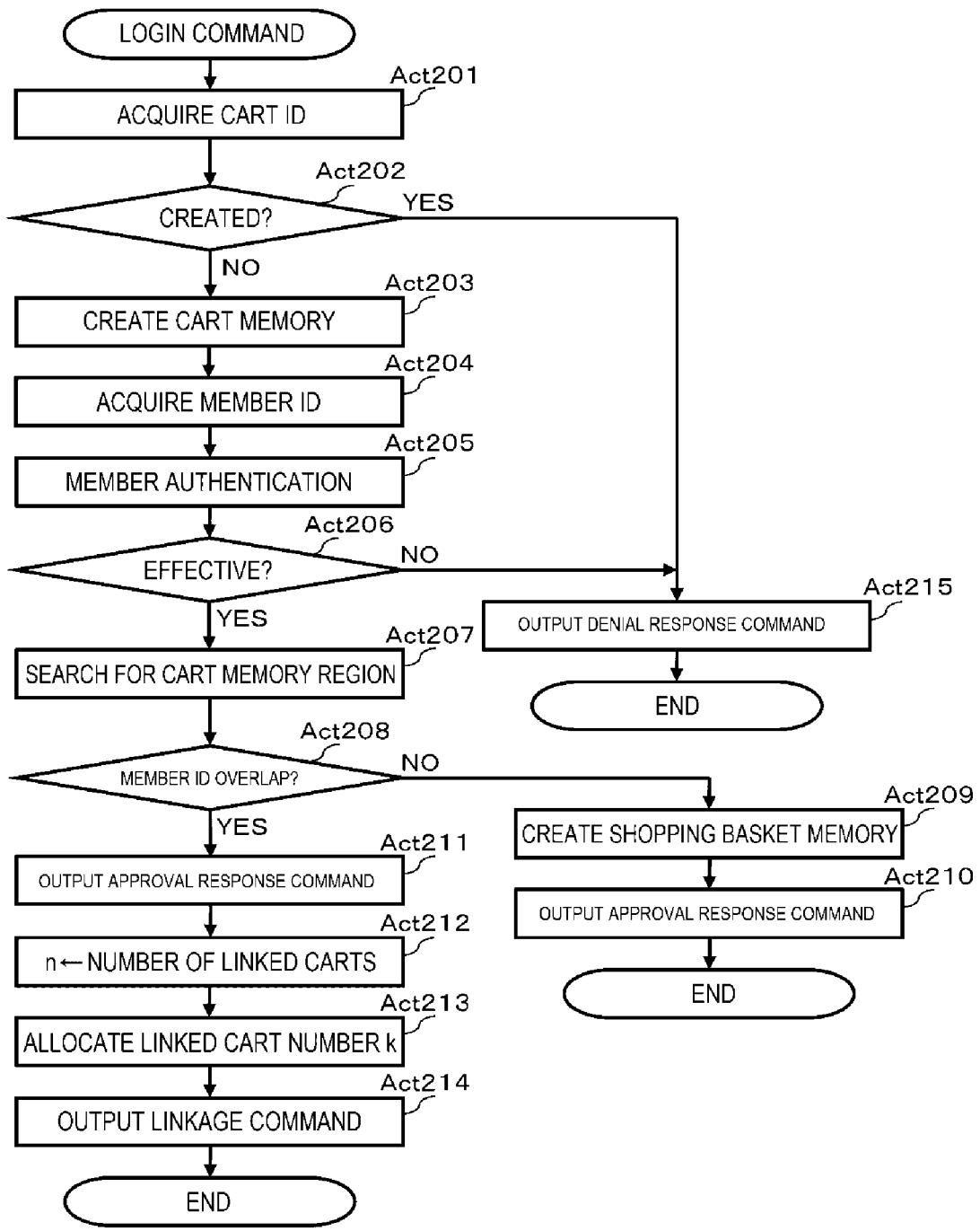
FIG. 12 is a flowchart illustrating a procedure of login command reception processing executed by a processor of the virtual POS server.

In this manner, if the group customer performs the login operation with the information terminal 60A provided in the first cart C01 and the login is approved, in the virtual POS server 30, the processing in Act 207 to Act 210 in FIG. 12 is executed by the processor 31. Therefore, the shopping basket memory 322 of the member ID approved by the login is created. The approval response command is output from the virtual POS server 30 to the information terminal 60A. As a result, the normal registration screen SC1 is displayed on the touch panel 65 of the information terminal 60A. The processor 61 of the information terminal 60A comes into the waiting state in Act 108 to Act 113.

Subsequently, if the group customer performs, with the same member card, login operation with the information terminal 60B provided in the second cart C02, in the virtual POS server 30, the processing in Act 207, Act 208, and Act 211 to Act 214 in FIG. 12 is executed by the processor 31. According to the processing, first, the normal registration screen SC1 is displayed on the touch panel 65 of the information terminal 60B from the virtual POS server 30. The processor 61 of the information terminal 60B enters into the waiting state in Act 108 to Act 113.

On the other hand, in the virtual POS server 30, "2" is stored as the number of linked carts n and "1" is stored as the linked cart number k in the cart memory 321A in which the cart ID of the information terminal 60A is stored. "2" is stored as the number of linked carts n and "2" is stored as the linked cart number k in the cart memory 321B in which the cart ID of the information terminal 60B is stored. A linkage command is transmitted to the information terminal 60A and the information terminal 60B from the virtual POS server 30. By receiving the linkage command, the processor 61 of the information terminal 60A or the information terminal 60B in the waiting state in Act 108 to Act 113 determines YES in Act 108 and proceeds to Act 121 in FIG. 8.

In Act 121, the processor 61 acquires the number of linked carts n from the linkage command. In Act 122, the processor 61 confirms whether the number of linked carts n is larger than "1". In the case of the example explained above, the number of linked carts n is "2". Therefore, the processor 61 determines YES in Act 122 and proceeds to Act 123. In Act 123, the processor 61 controls the lamp 69 to be lit. The processor 61 changes the screen of the touch panel 65 from the normal registration screen SC1 to a registration screen for linkage SC2. Thereafter, the processor 61 returns to the waiting state in Act 108 to Act 113.

Figure 19:
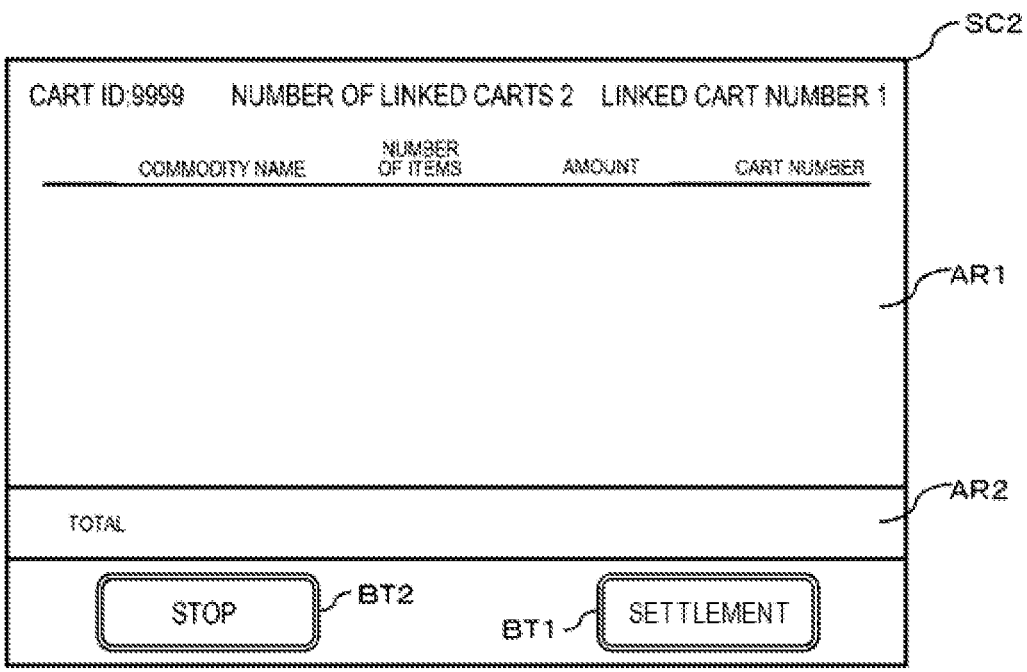
FIG. 19 is a schematic diagram illustrating an example of a registration screen for linkage displayed on the touch panel of the information terminal.

An example of the registration screen for linkage SC2 is illustrated in FIG. 19. As illustrated in FIG. 19, the registration screen for linkage SC2 is different from the normal registration screen SC1 in that a region of a cart number is added to the display region AR1 of the commodity list and in that the number of linked carts n and the linked cart number acquired from the linkage command are displayed in an upper part of the screen. The cart number is a linked cart number added to the commodity data stored in the shopping basket memory 322.

In this manner, in the information terminal 60A that receives the linkage command, the screen of the touch panel 65 is switched from the normal registration screen SC1 to the registration screen for linkage SC2 in which the number of linked carts is "2" and the linked cart number is "1". Similarly, in the information terminal 60B that receives the linkage command, the screen of the touch panel 65 is switched from the normal registration screen SC1 to the registration screen for linkage SC2 in which the number of linked carts is "2" and the linked cart number is "2". In the information terminal 60A and the information terminal 60B, the lamps 69 are respectively lit.

Incidentally, if the group customer logs into an information terminal 60C of a cart C03 with the same member card in order to use the third cart C03, the virtual POS server 30 and the information terminals 60A, 60B, and 60C operate in the same manner as when the second cart C02 logs into the information terminal 60B. Therefore, in the information terminal 60A, the screen of the touch panel 65 is the registration screen for linkage SC2 in which the number of linked carts is "3" and the linked cart number is "1". In the information terminal 60B, the screen of the touch panel 65 is the registration screen for linkage SC2 in which the number of linked carts is "3" and the linked cart number is "2". In the information terminal 60C, the screen of the touch panel 65 is the registration screen for linkage SC2 in which the number of linked carts is "3" and the linked cart number is "3".

<Registration Operation for Commodities>

A registration operation for commodities performed by, for example, a group customer who uses two carts C01 and C02 is explained.

The group customer logs into the information terminals 60A and 60B of the two carts C01 and C02, respectively, and thereafter moves around a sales floor and puts commodities to be purchased in the shopping baskets SB placed on the carts C01 and C02. At this time, before putting the commodities in the shopping basket SB, the group customer causes the scanners 66 to read code symbols attached to the commodities. If the code symbols are read by the scanners 66, commodity codes represented by the code symbols are input to the information terminals 60A and 60B. That is, commodities identified by the commodity codes are registered.

Code symbols are sometimes not attached to a part of commodities such as perishables (e.g., fruit and/or vegetables). If code symbols are not attached to the commodities, the customer touches commodity buttons corresponding to such commodities among commodity buttons displayed on the touch panels 65. If the commodity buttons are touched, commodity codes of commodities corresponding to the commodity buttons are input to the information terminals 60A and 60B. That is, commodities identified by the commodity codes are registered.

The processor 61 of the information terminal 60 in the waiting states in Act 108 to Act 113 confirms that the commodity registration is performed. Then, in Act 109, the processor 61 determines YES in Act 109 and proceeds to Act 131 in FIG. 9. In Act 131, the processor 61 controls the wireless unit 64 to output a commodity registration command to the virtual POS server 30. According to this control, the wireless unit 64 wirelessly transmits the commodity registration command. The commodity registration command is received by the access point 70 and transmitted to the virtual POS server 30 via the network 2. The commodity registration command includes the cart ID acquired in the processing in Act 103, the member ID stored in the processing in Act 106, and the commodity codes of the registered commodities. Therefore, member IDs included in commodity registration commands respectively transmitted from the information terminal 60A and the information terminal 60B coincide.

Figure 9:
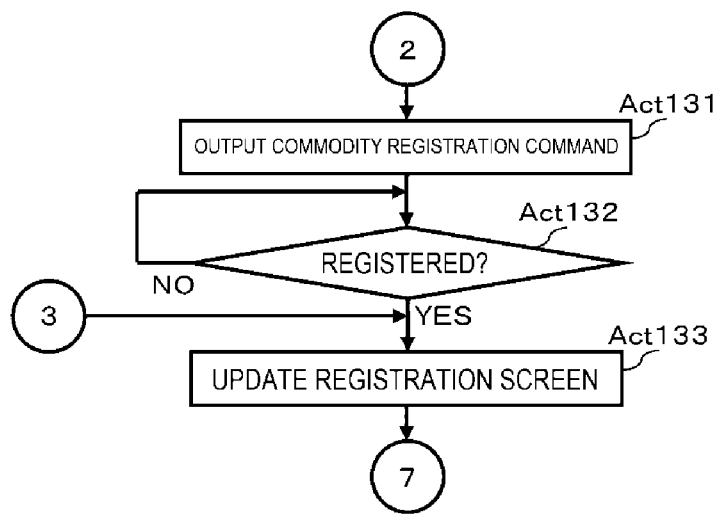
FIG. 9 is a flowchart illustrating the main information processing executed by the processor of the information terminal.

The processor 61 of the information terminal 60 executes the processing in Act 109 in FIG. 7 and Act 131 in FIG. 9 to function as a commodity accepting section that accepts commodities to be purchased by a purchaser.

Figure 13:
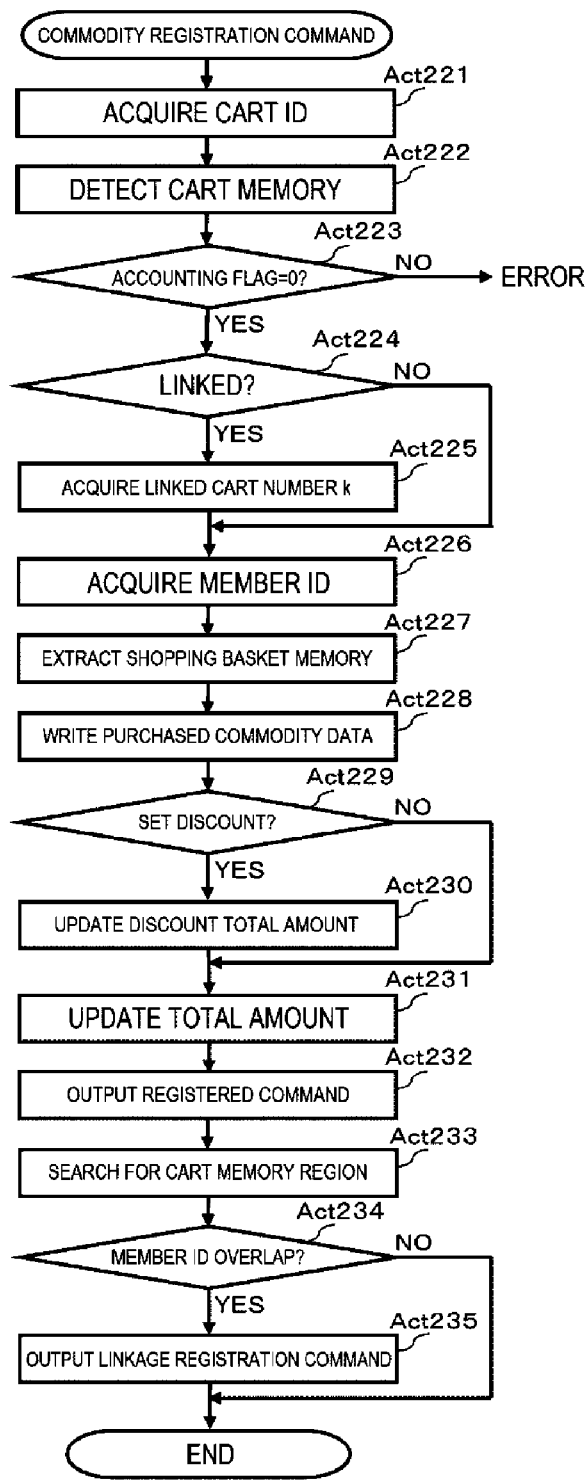
FIG. 13 is a flowchart illustrating a procedure of a commodity registration command reception processing executed by the processor of the virtual POS server.

The processor 31 of the virtual POS server 30 confirms that the command received via the communication interface 34 is the commodity registration command and starts command reception processing of the procedure illustrated in the flowchart of FIG. 13.

In Act 221, the processor 31 acquires the cart ID from the commodity registration command. In Act 222, the processor 31 detects, from the main memory 32, the cart memory 321 in which the acquired cart ID is stored. In the following explanation, the cart memory 321 in which the cart ID acquired from the commodity registration command is stored, is represented as a cart memory 321C.

In Act 223, the processor 31 checks a settlement flag stored in the cart memory 321C. If the settlement flag is set to "1", the processor 31 determines that the commodity registration is an error. That is, the processor 31 prohibits commodity registration if the settlement flag is set to "1". If the commodity registration is an error, the information terminal 60 at the commodity registration command transmission source is informed that the commodity registration is an error.

If the settlement flag is reset to "0" in Act 223, in Act 224, the processor 31 determines, according to a value of the number of linked carts n stored in the cart memory 321C, whether the cart C identified by the cart ID is in the linked state with the other cart C. If the number of linked carts n is "1", the processor 31 determines that the cart C is not in the linked state with the other cart C. If the number of linked carts n is "2" or more, the processor 31 determines that the cart C is in the linked state with the other cart C. If the cart C is in the linked state with the other cart C, in Act 225, the processor 31 acquires the linked cart number k from the cart memory 321C. Thereafter, the processor 31 proceeds to Act 231. If the cart C is not in the linked state with the other cart C, the processor 31 skips the processing in Act 225 and proceeds to Act 226.

In Act 226, the processor 31 acquires a member ID from the commodity registration command. In Act 227, the processor 31 extracts, as a processing target, the shopping basket memory 322 in which the member ID is stored. In the following explanation, the shopping basket memory 322 in which the member ID acquired from the commodity registration command is stored, is represented as a shopping basket memory 322B. Therefore, the shopping basket memory 322B extracted in Act 227 coincides not only when the commodity registration command transmitted from the information terminal 60A is received but also when the commodity registration command transmitted from the information terminal 60B is received.

If the processing in Act 226 and Act 227 is ended, in Act 228, the processor 31 creates commodity data based on a commodity code included in the commodity registration command and stores the commodity data in the shopping basket memory 322B. At this time, if the linked cart number k is acquired in Act 225, the processor 31 adds the linked cart number k to the commodity data. If the linked cart number k is not acquired, the processor 31 does not add the linked cart number k to the commodity data.

Therefore, if registration of commodities is performed in the information terminal 60 of the cart C not linked with the other cart C, in a state in which the linked cart number k is not added, commodity data is stored in the shopping basket memory 322B in which a member ID of a customer logging in with the information terminal 60 is stored. On the other hand, for example, in the case of the group customer who links and uses the two carts C01 and C02, commodity data of commodities registered in the information terminal 60A and commodity data of commodities registered in the information terminal 60B are collectively saved in the shopping basket memory 322B. As the linked cart number k, "1" is added to the commodity data of the commodities registered in the information terminal 60A. As the linked cart number k, "2" is added to the commodity data of the commodities registered in the information terminal 60B.

If the processing in Act 228 is ended, in Act 229, the processor 31 determines, from the commodity data stored in the shopping basket memory 322B, whether a set discount is included. For example, a database in which data related to combinations of commodities set as targets of the set discount is registered is included in the virtual POS server 30. The processor 31 confirms, referring to the database, whether a combination of commodities set as targets of the set discount is included. If the combination is not included, the processor 31 determines that the set discount is not included. If the combination is included, the processor 31 determines that the set discount is included. Therefore, the set discount could be included only by the commodities registered in the information terminal 60A or the commodities registered in the information terminal 60B. However, the set discount could be included by the commodities registered in the information terminal 60A and the commodities registered in the information terminal 60B.

If the set discount is included, in Act 229, the processor 31 determines YES and proceeds to Act 230. In Act 230, the processor 31 calculates a discount amount of the set discount and adds the discount amount to a discount total amount of the shopping basket memory 322B. Thereafter, the processor 31 proceeds to Act 231. On the other hand, if the set discount is not included, the processor 31 determines NO in Act 229 and proceeds to Act 231 skipping processing in Act 230. In Act 231, the processor 31 adds a sales amount and a tax amount of the commodities to the total amount of the shopping basket memory 322B. At this time, if the discount amount is calculated in Act 230, the processor 31 reduces the discount amount from the total amount.

If the processing in Act 231 is ended, in Act 232, the processor 31 controls the communication interface 34 to output a registration completion command addressed to the cart ID acquired from the commodity registration command. According to this control, the communication interface 34 transmits the registration completion command to the network 2. The registration completion command is wirelessly transmitted from the access point 70 via the network 2. The registration completion command is received by the information terminal 60 at the commodity registration command transmission source. The registration completion command includes a commodity list generated from the commodity data, the discount total amount, and the total amount stored in the shopping basket memory 322B.

In Act 233, the processor 31 searches for, with the member ID acquired from the commodity registration command, a region where the cart memory 321 is set up in the main memory 32. In Act 234, the processor 31 confirms whether a plurality of cart memories 321 in which the member ID is stored, are present. In the following explanation, the cart memory 321 in which the member ID acquired from the commodity registration command is stored, is represented as a cart memory 321D. If only one cart memory 321D is present, the processor 31 determines NO in Act 234 and ends the reception processing of the commodity registration command.

If two or more cart memories 321D are present, the processor 31 determines YES in Act 234 and proceeds to Act 235. In Act 235, the processor 31 controls the communication interface 34 to output a linkage registration command addressed to a cart ID to which the registration completion command is not transmitted among the cart IDs stored in the cart memory 321D. According to this control, the communication interface 34 transmits linkage registration commands as many as a number obtained by subtracting 1 from the number of linked carts n to the network 2. Like the registration completion command, the linkage registration command includes the commodity list generated from the commodity data, the discount total amount, and the total amount stored in the shopping basket memory 322B. The processor 31 ends the reception processing of the commodity registration command.

Therefore, if the group customer who links and uses the two carts C01 and C02 performs registration of commodities with the information terminal 60A provided in the cart C01, the processing in Act 221 to Act 235 is executed in the virtual POS server 30. As a result, the registration completion command is output from the virtual POS server 30 to the information terminal 60A. The linkage registration command of the same content as the content of the registration completion command is transmitted from the virtual POS server 30 to the information terminal 60B provided in the cart C02.

Similarly, if the group customer performs registration of commodities with the information terminal 60B provided in the cart C02, the processing in Act 221 to Act 235 is executed in the virtual POS server 30. As a result, the registration completion command is output from the virtual POS server 30 to the information terminal 60B. The linkage registration command of the same content as the content of the registration completion command is transmitted from the virtual POS server 30 to the information terminal 60A provided in the cart C01.

Referring back to FIG. 9, in Act 132, the processor 61 of the information terminal 60, which controls the output of the commodity registration command in Act 131, waits for the registration completion command. If the registration completion command is received from the virtual POS server 30, the processor 61 determines YES in Act 132 and proceeds to Act 133. In Act 133, the processor 61 updates the normal registration screen SC1 or the registration screen for linkage SC2 displayed on the touch panel 65. That is, the processor 61 updates the commodity list included in the registration completion command to be displayed in a region A1 of the normal registration screen SC1 or the registration screen for linkage SC2. The processor 61 updates the discount amount and the total amount included in the registration completion command to be displayed in a region A2 of the normal registration screen SC1 or the registration screen for linkage SC2. Thereafter, the processor 61 returns to the waiting state in Act 108 to Act 113.

On the other hand, if the processor 61 in the waiting state in Act 108 to Act 113 receives the linkage registration command, the processor 61 determines YES in Act 110 and proceeds to Act 133 in FIG. 9. That is, the processor 61 updates the commodity list included in the linkage registration command to be displayed in the region A1 of the registration screen for linkage SC2. The processor 61 updates the discount amount and the total amount included in the registration completion command to be displayed in the region A2 of the registration screen for linkage SC2. Thereafter, the processor 61 returns to the waiting state in Act 108 to Act 113.

Figures 20, 21:
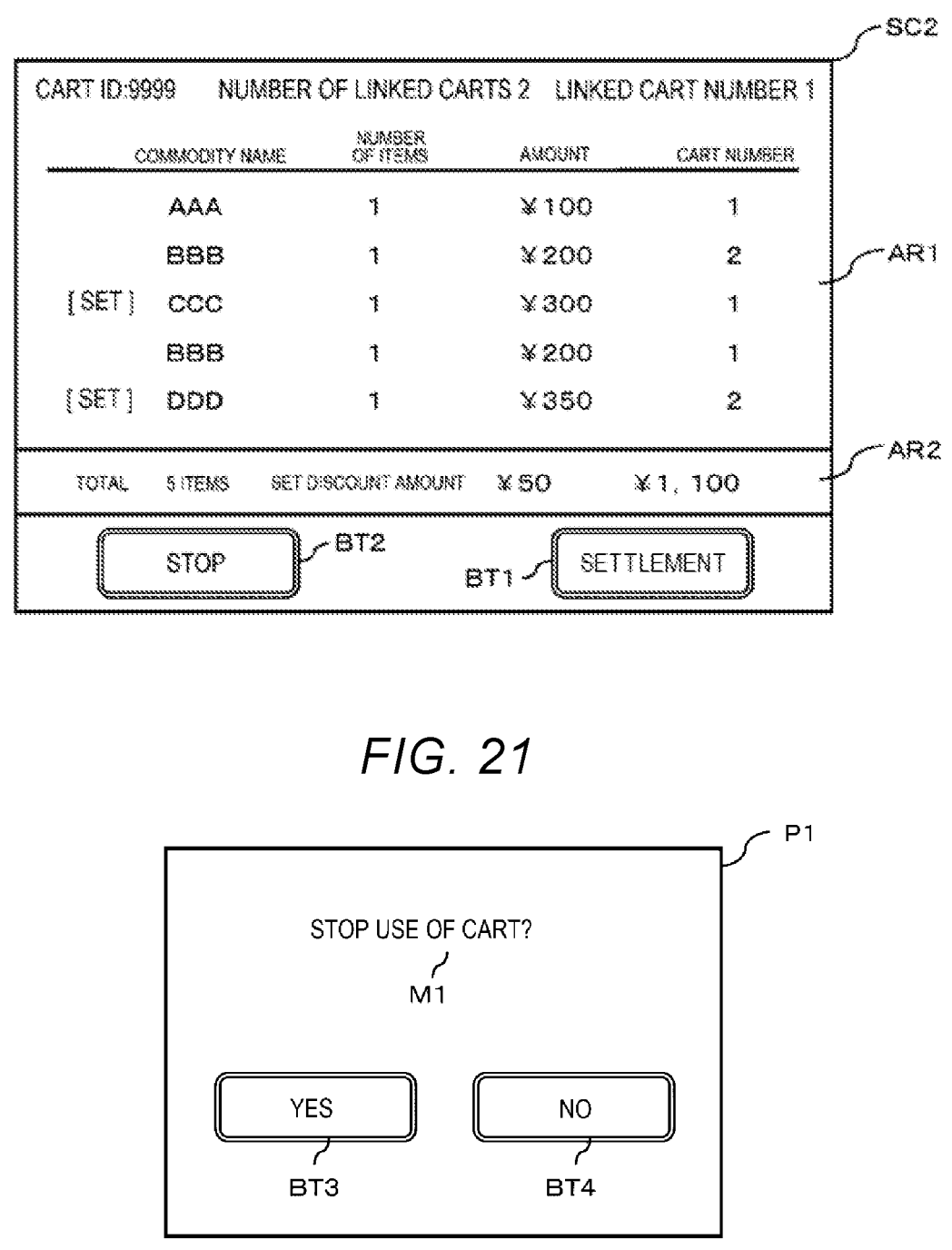

FIG. 20 is an example of the registration screen for linkage SC2 displayed on the touch panel 65 of the information terminal 60A provided in the cart C01. The registration screen for linkage SC2 illustrated in FIG. 20 is displayed on the touch panel 65 of the information terminal 60A according to the processing in Act 132 and Act 133 explained above. At this time, according to the processing in Act 110 and Act 133 explained above, the registration screen for linkage SC2 in which the linked cart number is "2" and the others are common is displayed on the touch panel 65 of the information terminal 60B provided in the cart C02 that is in the linked relation with the cart C01.

From the registration screen for linkage SC2, it is seen from differences of cart numbers displayed in the display region AR1 that commodities of three items with commodity names [AAA], [CCC], and [BBB] displayed in the first row, the third row, and the fourth row of the display region AR1 are registered in the information terminal 60A provided in the cart C01. Similarly, it is seen that commodities of two items with commodity names [BBB] and [DDD] displayed in the second row and the fifth row of the display region AR1 are registered in the information terminal 60B provided in the cart C02. It is seen that the set discount is included by the commodity with the commodity name [CCC] registered in the information terminal 60A and the commodity with the commodity name [DDD] registered in the information terminal 60B.

<Operation Related to a Stop of the Use of the Carts>

An operation performed if the group customer who links and uses the two carts C01 and C02, stops the use of one cart C2 is explained.

The registration screens for linkage SC2 are displayed on the touch panels 65 of the information terminal 60A and the information terminal 60B respectively provided in the cart C01 and the cart C02. In this state, if the use of the cart C02 is to be stopped, the group customer touches the stop button BT2 on the registration screen for linkage SC2 displayed on the touch panel 65 of the information terminal 60B.

Figure 10:
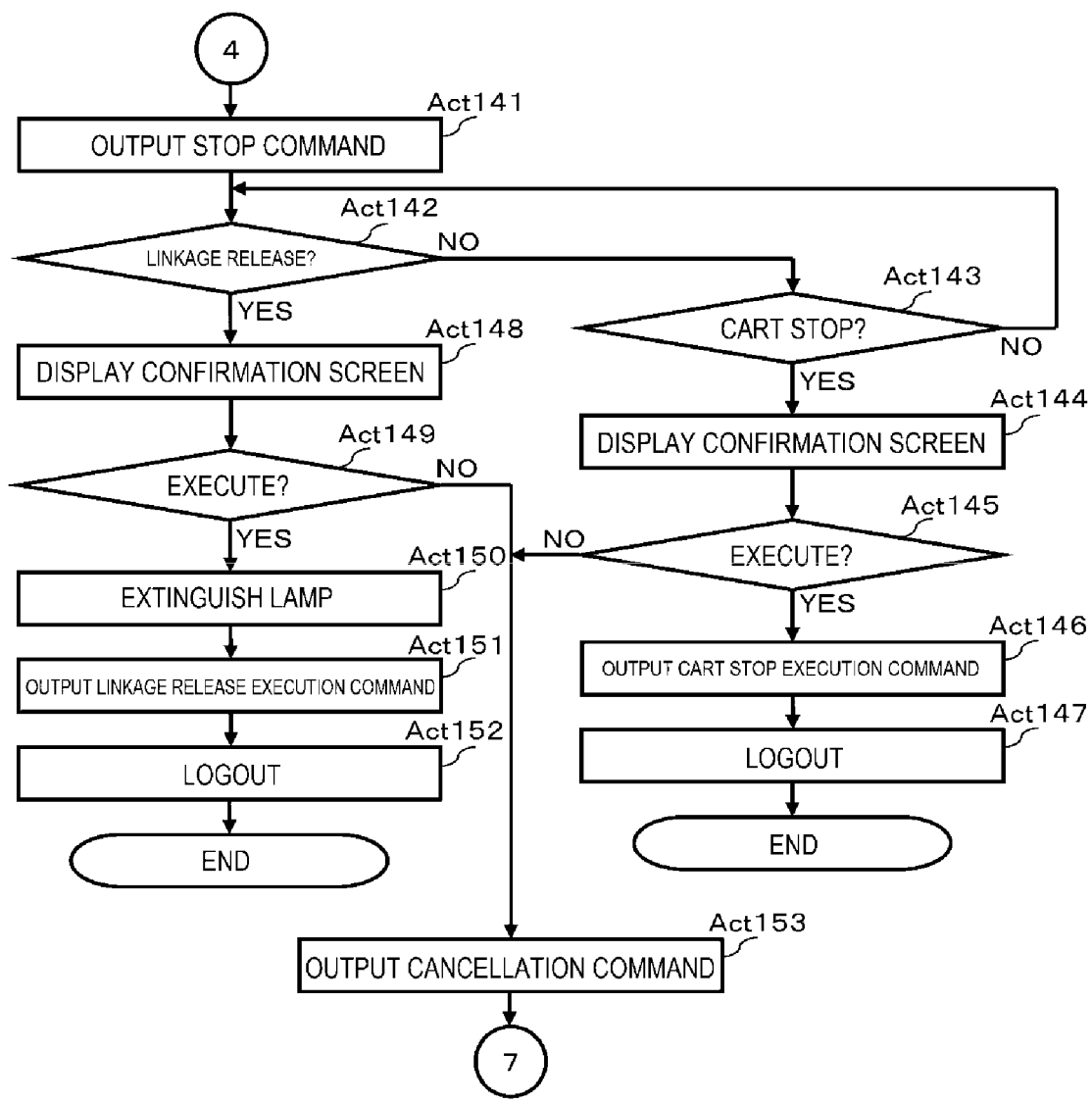
FIG. 10 is a flowchart illustrating the main information processing executed by the processor of the information terminal.

If detection of the stop button BT2 being touched is detected, the processor 61 of the information terminal 60 in the waiting state in Act 108 to Act 113 determines YES in Act 111 and proceeds to Act 141 in FIG. 10. In Act 141, the processor 61 controls the wireless unit 64 to output a stop command to the virtual POS server 30. According to this control, the wireless unit 64 wirelessly transmits the stop command. The stop command is received by the access point 70 and transmitted to the virtual POS server 30 through the network 2. The stop command includes the cart ID acquired in the processing in Act 103.

Figure 14:
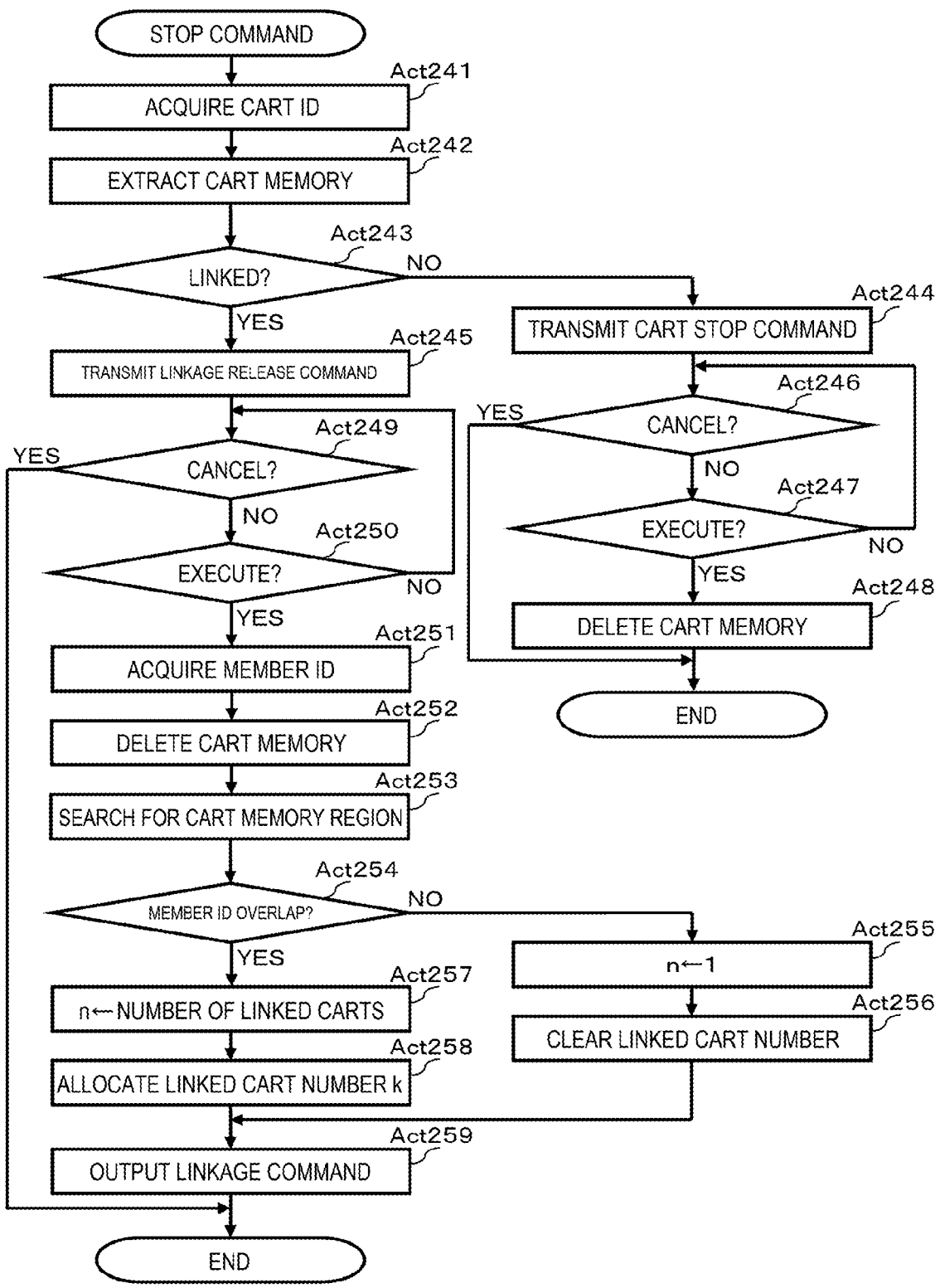
FIG. 14 is a flowchart illustrating a procedure of stop command reception processing executed by the processor of the virtual POS server.

If the stop command from the information terminal 60 is received via the communication interface 34, the processor 31 of the virtual POS server 30 starts the information processing of the procedure illustrated in the flowchart of FIG. 14. In Act 241, the processor 31 acquires a cart ID from the stop command. In Act 242, the processor 31 searches for, with the cart ID, a region where the cart memory 321 is set up in the main memory 32 and extracts, as a processing target, the cart memory 321 in which the cart ID is stored. In the following explanation, the cart memory 321 extracted as the processing target in the reception processing of the stop command is represented as a cart memory 321E.

In Act 243, as in Act 223, the processor 31 determines, with a value of the number of linked carts n stored in the cart memory 321E, whether the cart C identified by the cart ID is in the linked state with the other cart C. If the stop button BT2 of the normal registration screen SC1 is touched, the cart C in which the information terminal 60 displaying the normal registration screen SC1 is provided is not linked with the other cart C. In this case, the processor 31 determines NO in Act 243 and proceeds to Act 244. In Act 244, the processor 31 controls the communication interface 34 to output a cart stop command addressed to the cart ID stored in the cart memory 321E. According to this control, the communication interface 34 transmits the cart stop command to the network 2.

On the other hand, if the stop button BT2 of the registration screen for linkage SC2 is touched, the cart C in which the information terminal 60 displaying the registration screen for linkage SC2 is provided is linked with the other cart C. In this case, the processor 31 determines YES in Act 243 and proceeds to Act 245. In Act 245, the processor 31 controls the communication interface 34 to output a linkage release command addressed to the cart ID stored in the cart memory 321E. According to this control, the communication interface 34 transmits the linkage release command to the network 2.

Therefore, if the stop button BT2 is touched in the information terminal 60 displaying the normal registration screen SC1, the cart stop command is transmitted to the information terminal 60 from the virtual POS server 30. If the stop button BT2 is touched in the information terminal 60 displaying the registration screen for linkage SC2, the linkage release command is transmitted to the information terminal 60 from the virtual POS server 30.

Referring back to FIG. 10, in Act 142, the processor 61 of the information terminal 60, which controls the output of the stop command, confirms whether the processor 61 receives the linkage release command. If the linkage release command is not received, the processor 61 determines NO in Act 142 and proceeds to Act 143. In Act 143, the processor 61 confirms whether the processor 61 receives the cart stop command. If the cart stop command is not received, in Act 143, the processor 61 determines NO in Act 143 and returns to Act 142. The processor 61 waits for receiving the linkage release command or receiving the cart stop command.

If the cart stop command is received in the waiting state, the processor 61 determines YES in Act 143 and proceeds to Act 144. In Act 144, the processor 61 causes the touch panel 65 to popup-display a confirmation image P1 on the screen of the touch panel 65. The confirmation image P1 is an image for inquiring the customer whether stopping the use of the cart C is correct.

An example of the confirmation image P1 is illustrated in FIG. 21. As illustrated in FIG. 21, the confirmation image P1 includes, together with a message M1 for inquiring the customer about the stop of the use of the cart, images of a "YES" button BT3 for instructing execution and a "NO" button BT4 for instructing cancellation. The customer confirming the message M1 touches the "YES" button BT3 for stopping the use of the cart and touches the "NO" button BT4 for not stopping the use of the cart.

In Act 145, the processor 61, which causes the touch panel 65 to display the confirmation image P1, waits for an input for instructing whether to execute the stop of the use of the carts C. If the "YES" button BT3 is touched, the processor 61 regards that the execution of the stop of the use is instructed. The processor 61 determines YES in Act 145 and proceeds to Act 146. In Act 146, the processor 61 controls the wireless unit 64 to output a cart stop execution command to the virtual POS server 30. According to this control, the wireless unit 64 wirelessly transmits the cart stop execution command. The cart stop execution command is received by the access point 70 and transmitted to the virtual POS server 30 via the network 2. The cart stop execution command includes the cart ID acquired in the processing in Act 103.

In Act 147, the processor 61, which controls the transmission of the cart stop execution command, performs logout of the information terminal 60. Upon performing the logout, the processor 61 ends the information processing executed by the terminal program.

If the linkage release command is received in the waiting state in Act 142 and Act 143, the processor 61 determines YES in Act 142 and proceeds to Act 148. In Act 148, the processor 61 causes the touch panel 65 to popup-display a confirmation image P2 on the screen of the touch panel 65. The confirmation image P2 is an image for inquiring the customer whether releasing linkage of the cart is correct.

Figure 22:
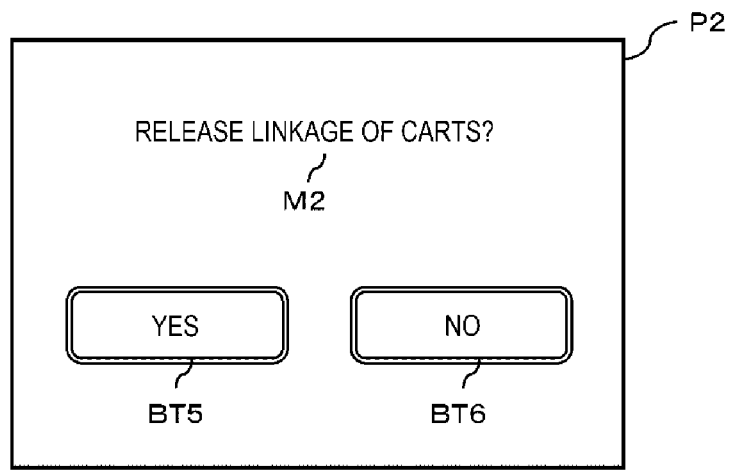
FIG. 22 is a schematic diagram illustrating an example of a conformation image displayed on the touch panel of the information terminal.

An example of the confirmation image P2 is illustrated in FIG. 22. As illustrated in FIG. 22, the confirmation image P2 includes, together with a message M2 for inquiring the customer about the linkage release of the cart, images of a "YES" button BT5 for instructing execution and a "NO" button BT6 for instructing cancellation. The customer confirming the message M2 touches the "YES" button BT5 for executing the linkage release of the cart and touches "NO" button BT6 for stopping the linkage release of the cart.

In Act 149, the processor 61, which causes the touch panel 65 to display the confirmation image P2, waits for an input for instructing whether to execute the linkage release. If the "YES" button BT5 is touched, the processor 61 regards that the linkage release execution of the cart C is instructed. The processor 61 determines YES in Act 149 and proceeds to Act 150. In Act 150, the processor 61 controls the lamp 69 to be turned off (extinguished). In Act 151, the processor 61 controls the wireless unit 64 to output a linkage release execution command to the virtual POS server 30. According to this control, the wireless unit 64 wirelessly transmits the linkage release execution command. The linkage release execution command is received by the access point 70 and transmitted to the virtual POS server 30 via the network 2. The linkage release execution command includes the cart ID acquired in the processing in Act 103.

In Act 152, the processor 61, which controls the transmission of the linkage release execution command, performs logout of the information terminal 60. Upon performing the logout, the processor 61 ends the information processing executed by the terminal program.

After causing the touch panel 65 to display the confirmation image P1, if the "NO" button BT4 is touched, the processor 61 determines NO in Act 145 and proceeds to Act 153. Similarly, after causing the touch panel 65 to display the confirmation image P2, if the "NO" button BT6 is touched, the processor 61 determines NO in Act 149 and proceeds to Act 153. In Act 153, the processor 61 controls the wireless unit 64 to output a cancellation command to the virtual POS server 30. According to this control, the wireless unit 64 wirelessly transmits the cancellation command. The cancellation command is received by the access point 70 and transmitted to the virtual POS server 30 via the network 2. The processor 61, which controls the transmission of the cancellation command, returns to the waiting state in Act 108 to Act 113.

Referring back to FIG. 14, in Act 246, the processor 31, which controls the transmission of the cart stop command in Act 244, confirms whether the processor 31 receives the cancellation command. If the cancellation command is not received, the processor 31 determines NO in Act 246 and proceeds to Act 247. In Act 247, the processor 31 confirms whether the processor 31 receives the cart stop execution command. If the cart stop execution command is not received, the processor 31 determines NO in Act 247 and returns to Act 246. In Act 246 and Act 247, the processor 31 waits for receiving the cancellation command or receiving the cart stop execution command.

If the cart stop execution command is received in the waiting state, the processor 31 determines YES in Act 247 and proceeds to Act 248. In Act 248, the processor 31 deletes the cart memory 321E in which the cart ID included in the cart stop execution command are stored. The processor 31 ends the stop command reception processing.

If the cancellation command is received in the waiting state in Act 246 and Act 247, the processor 31 determines YES in Act 246 and ends the stop command reception processing without executing the processing in Act 248.

In Act 249, the processor 31, which controls the transmission of the linkage release command in Act 245, confirms whether the processor 31 receives the cancellation command. If the cancellation command is not received, the processor 31 determines NO in Act 249 and proceeds to Act 250. In Act 250, the processor 31 confirms whether the processor 31 receives the linkage release execution command. If the linkage release execution command is not received, the processor 31 determines NO in Act 250 and returns to Act 249. In Act 249 and Act 250, the processor 31 waits for receiving the cancellation command or receiving the linkage release execution command.

If the linkage release execution command is received in the waiting state, the processor 31 determines YES in Act 250 and proceeds to Act 251. In Act 251, the processor 31 acquires a member ID from the cart memory 321E in which the cart ID included in the linkage release execution command is stored. After acquiring the member ID, in Act 252, the processor 31 deletes the cart memory 321E.

In Act 253, the processor 31 searches for, with the member ID acquired from the cart memory 321E, a region where the cart memory 321 is set up in the main memory 32. In Act 254, the processor 31 confirms whether a plurality of cart memories 321 in which the member ID is stored, are present. In the following explanation, another cart memory 321 in which a member ID overlapping the member ID stored in the cart memory 321E is stored, is represented as a cart memory 321F. At least one cart memory 321F is present.

If there is only one cart memory 321F, the processor 31 determines NO in Act 254 and proceeds to Act 255. In Act 255, the processor 31 rewrites the number of linked carts n of the cart memory 321F as "1". In Act 256, the processor 31 clears the linked cart number k of the cart memory 321F to "0". Thereafter, the processor 31 proceeds to Act 259. In Act 259, the processor 31 controls the communication interface 34 to output a linkage command addressed to the cart ID stored in the cart memory 321F. According to this control, the communication interface 34 transmits a linkage command addressed to one cart ID to the network 2. The linkage command includes the number of linked carts n and the linked cart number k of the cart memory 321F in which the cart ID to which the linkage command is addressed is stored. Therefore, in this case, the linkage command in which the number of linked carts n is "1" and the linked cart number k is "0" is transmitted.

In Act 254, if a plurality of cart memories 321F are present, the processor 31 determines YES and proceeds to Act 257. In Act 257, the processor 31 sets a total number of the cart memories 321F as the number of linked carts n. The processor 31 stores the number of linked carts n respectively in the plurality of cart memories 321F. In Act 258, the processor 31 allocates linked cart numbers k from an initial value "1" to the number of linked carts n one by one to the plurality of cart memories 321F. The linked cart numbers k may be allocated in any manner. For example, if two cart memories 321F are present, the processor 31 allocates "1" to one cart memory 321F as the linked cart number k and allocates "2" to the other cart memory 321F as the linked cart number k. The linked cart numbers k may be allocated in the opposite manner.

If the processing in Act 257 and Act 258 is ended, the processor 31 proceeds to Act 259. In Act 259, the processor 31 controls the communication interface 34 to output a linkage command addressed to cart IDs stored respectively in the cart memories 321F. According to this control, the communication interface 34 transmits a plurality of linkage commands respectively addressed to a different plurality of cart IDs. The linkage commands include the number of linked carts n and the linked cart number k of the cart memories 321F in which the cart IDs to which the linkage commands are respectively addressed are stored. Therefore, in this case, the linkage commands allocated with the number of linked carts n equal to or larger than "2" and linked cart number k equal to or larger than "1" are transmitted.

If the processing in Act 259 is ended, the processor 31 ends the stop command reception processing.

If the cancellation command is received in the waiting state in Act 249 and Act 250, the processor 31 determines YES in Act 249 and ends the stop command reception processing without executing the processing in Act 251 to Act 259.

In this manner, the linkage command output through the processing in Act 255 and Act 256 is wirelessly transmitted from the access point 70 via the network 2 and received by an information terminal 60D. The information terminal 60D represents the information terminal 60 that instructs execution of linkage release. On the other hand, the linkage command output through the processing in Act 257 and Act 258 is wirelessly transmitted from the access point 70 via the network 2 and received by the information terminal 60D and an information terminal 60E. The information terminal 60E represents the information terminal 60 identified by the cart ID of the cart memory 321F. The same member ID as the member ID stored in the cart memory 321E including the cart ID of the information terminal 60D, which instructs the execution of the linkage release, is stored in the cart memory 321F.

Figure 8:
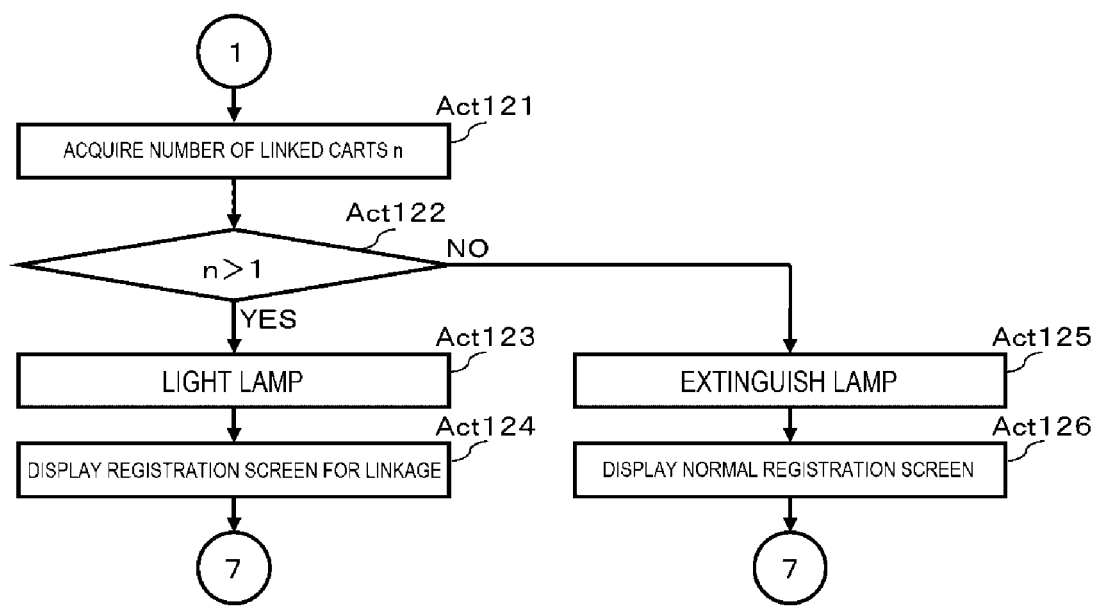
FIG. 8 is a flowchart illustrating the main information processing executed by the processor of the information terminal.

The processor 61 of the information terminal 60D, which receives the linkage command output from the virtual POS server 30 through the processing in Act 255 and Act 256, starts the processing of the procedure illustrated in the flowchart of FIG. 8. That is, in Act 121, the processor 61 acquires the number of linked carts n from the linkage command. In Act 122, the processor 61 confirms whether the number of linked carts n is larger than "1". In this case, since the number of linked carts n is "1", the processor 61 determines NO in Act 122 and proceeds to Act 125. In Act 125, the processor 61 controls the lamp 69 to be turned off (i.e., extinguished). In Act 126, the processor 61 switches the screen of the touch panel 65 from the registration screen for linkage SC2 to the normal registration screen SC1. Thereafter, the processor 61 returns to the waiting state in Act 108 to Act 113.

On the other hand, the processor 61 of the information terminal 60D or the information terminal 60E that receives the linkage command output from the virtual POS server 30 through the processing in Act 257 and Act 258 also starts the processing of the procedure illustrated in the flowchart of FIG. 8. That is, in Act 121, the processor 61 acquires the number of linked carts n from the linkage command. In Act 122, the processor 61 confirms whether the number of linked carts n is larger than "1". In this case, since the number of linked carts n is equal to or larger than "2", the processor 61 executes the processing in Act 123 and Act 124 explained above.

Therefore, if the group customer who links and uses the cart C01 and the cart C02 touches the stop button BT2 on the registration screen for linkage SC2 in order to stop the use of the cart C02, the confirmation image P1 is displayed on the touch panel 65. If the group customer touches the [YES] button BT3, logout is performed in the information terminal 60B. In the virtual POS server 30, the cart memory 321 in which the cart ID set in the information terminal 60B is stored, is deleted. Consequently, the use of the cart C02 is stopped.

On the other hand, in the information terminal 60B provided in the cart C01 that is in the linked state with the cart C02, the screen of the touch panel 65 is switched from the registration screen for linkage SC2 to the normal registration screen SC1. The lamp 69 is turned off (i.e., extinguished). Therefore, the cart C01 is in an independently used state.

If use of one cart C is stopped in a state in which three or more carts C are linked, screens of the remaining carts C are changed to the registration screen for linkage SC2 in which the number of linked carts and a linked cart number are updated.

<Operation Related to a Settlement Instruction>

An operation performed if the group customer who links and uses the two carts C01 and C02 ends shopping, is explained.

In order to perform accounting, the group customer finishing the shopping touches the settlement button BT1 on the registration screen for linkage SC2 displayed on the touch panel 65 of the information terminal 60 provided in any one cart C.

Figure 11:
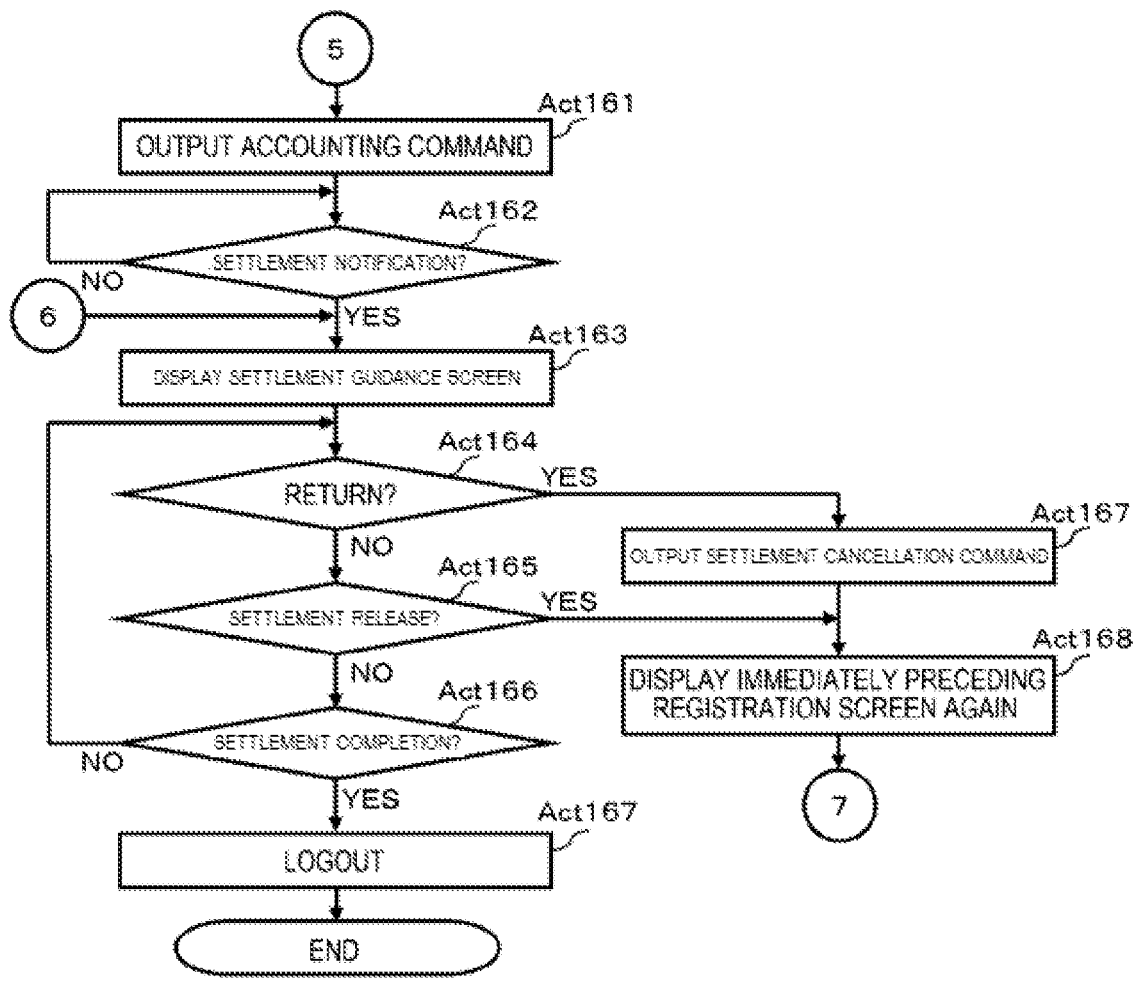
FIG. 11 is a flowchart illustrating the main information processing executed by the processor of the information terminal.

If the settlement button BT1 is detected as being touched, the processor 61 of the information terminal 60 in the waiting state in Act 108 to Act 113 determines YES in Act 112 and proceeds to Act 161 in FIG. 11. In Act 161, the processor 61 controls the wireless unit 64 to output a settlement command to the virtual POS server 30. According to this control, the wireless unit 64 wirelessly transmits the settlement command. The settlement command is received by the access point 70 and transmitted to the virtual POS server 30 via the network 2. The settlement command includes the cart ID acquired in the processing in Act 103 and the member ID stored in the processing in Act 106.

Figure 15:
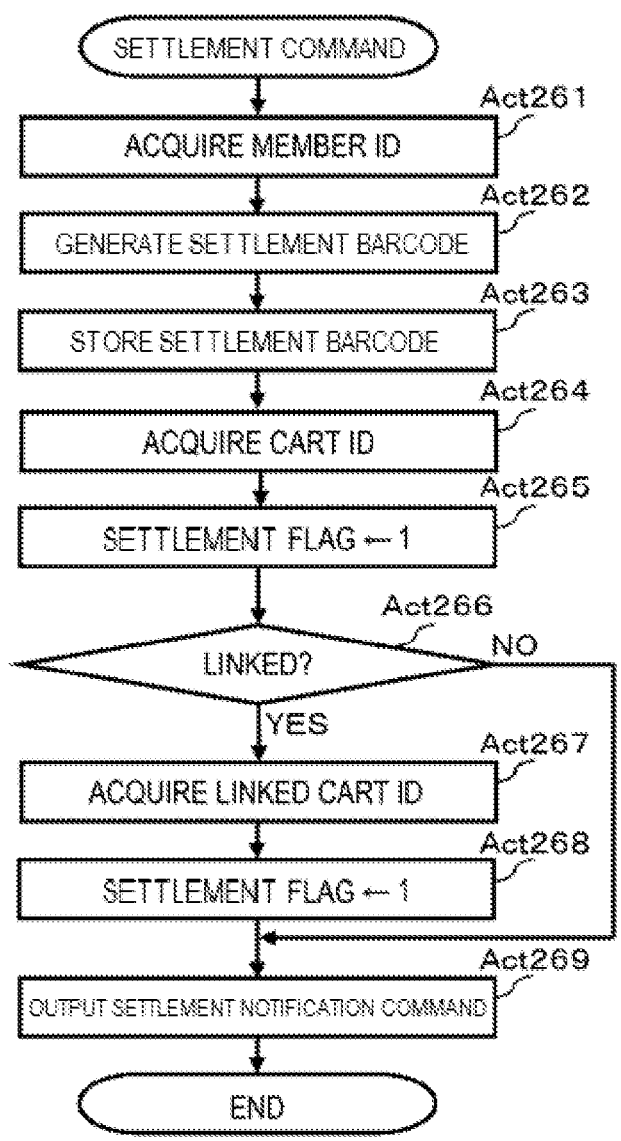
FIG. 15 is a flowchart illustrating a procedure of settlement command reception processing executed by the processor of the virtual POS server.

The processor 31 of the virtual POS server 30 that receives the settlement command starts the processing of the procedure illustrated in the flowchart of FIG. 15. That is, in Act 261, the processor 31 acquires a member ID from the settlement command. In Act 262, the processor 31 generates a settlement barcode. In Act 263, the processor 31 stores the settlement barcode in the shopping basket memory 322 in which the member ID acquired in the processing in Act 261 is set.

In Act 264, the processor 31 acquires a cart ID from the settlement command. In Act 265, the processor 31 sets the settlement flag of the cart memory 321 in which the cart ID is stored, to "1". In the following explanation, the cart memory 321 in which the cart ID acquired from the settlement command is stored, is represented as a cart memory 321G.

In Act 266, as in Act 223, the processor 31 determines, with a value of the number of linked carts n stored in the cart memory 321G, whether the cart C identified by the cart ID is in the linked state with the other cart C. If the cart C is not in the linked state with the other cart C, the processor 31 skips processing in Act 267 and Act 268 explained below and proceeds to Act 269. In Act 269, the processor 31 controls the communication interface 34 to output a settlement notification command addressed to the cart ID acquired from the settlement command. According to this control, the communication interface 34 transmits the settlement notification command to the network 2. The settlement notification command is wirelessly transmitted from the access point 70 via the network 2. The settlement notification command is received by the information terminal 60 at the settlement command transmission source. The settlement notification command includes a total amount and a settlement barcode of the shopping basket memory 322 in which the member ID acquired from the settlement command is stored. The processor 31 ends the reception processing of the settlement command.

In Act 266, the processor 31 determines YES if the cart C is in the linked state with the other cart C and proceeds to Act 267. In Act 267, the processor 31 searches for a region where the cart memory 321 is set up in the main memory 32 and acquires a cart ID from another cart memory 321 in which the same member ID as the member ID stored in the cart memory 321G is stored. In the following explanation, the other cart memory 321 in which the same member ID as the member ID stored in the cart memory 321G is stored, is represented as a cart memory 321H. In Act 268, the processor 31 sets a settlement flag of the cart memory 321H to "1". If a plurality of cart memories 321H are present, the processor 31 acquires cart IDs from the respective cart memories 321H. The processor 31 sets settlement flags of the respective cart memories 321H to "1". In the following explanation, the cart ID acquired from the cart memory 321H is referred to as linked cart ID.

If ending the processing in Act 267 and Act 268, the processor 31 proceeds to Act 269 explained above. That is, the processor 31 controls the communication interface 34 to output a settlement notification command addressed to the cart ID acquired from the settlement command. The processor 31 controls the communication interface 34 to output the settlement notification command addressed to one or a plurality of linked cart IDs. According to these kinds of control, the communication interface 34 transmits the settlement notification command addressed to the cart ID acquired from the settlement command and the settlement notification command addressed to the linked cart ID to the network 2. The settlement notification commands are wirelessly transmitted from the access point 70 via the network 2. One settlement notification command is received by the information terminal 60 at the settlement command transmission source. The other settlement notification command is received by the information terminal 60 provided in another cart C that is in the linked state with the cart C in which the information terminal 60 is provided. The settlement notification commands include a total amount and a settlement barcode of the shopping basket memory 322 in which the member ID acquired from the settlement command is stored. The processor 31 ends the reception processing of the settlement command.

Referring back to FIG. 11, in Act 162, the processor 61, which controls the transmission of the settlement command, waits for the settlement notification command. If the settlement notification command is received, the processor 61 determines YES in Act 162 and proceeds to Act 163. In Act 163, the processor 61 changes the screen of the touch panel 65 to a settlement guidance screen SC3.

Figure 23:
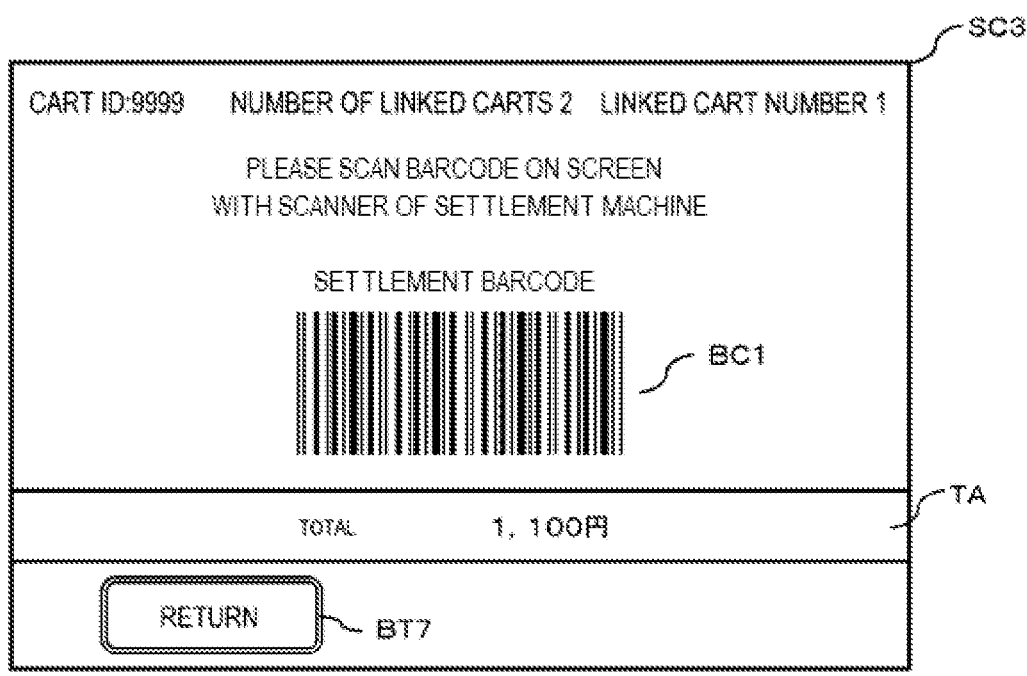
FIG. 23 is a schematic diagram illustrating an example of a linkage guidance screen displayed on the touch panel of the information terminal.

An example of the settlement guidance screen SC3 is illustrated in FIG. 23. As illustrated in FIG. 23, a settlement barcode BC1 and a total amount TA included in the settlement notification command are displayed on the settlement guidance screen SC3. An image of a [return] button BT7 is also displayed. The [return] button BT7 is touched if the customer instructs the stopping of a settlement operation.

In Act 164, the processor 61, which causes the touch panel 65 to display the settlement guidance screen SC3, confirms whether the [return] button BT7 is touched. If the [return] button BT7 is not touched, the processor 61 determines NO in Act 164 and proceeds to Act 165. In Act 165, the processor 61 confirms whether the processor 61 receives a settlement release command. The settlement release command is explained below. If the settlement release command is not received, the processor 61 determines NO in Act 165 and proceeds to Act 166. In Act 166, the processor 61 confirms whether the processor 61 receives a settlement completion command. The settlement completion command is also explained below. If the settlement completion command is not received, the processor 61 determines NO in Act 166 and returns to Act 164. The processor 61 waits for the [return] button BT7 to be touched, the settlement release command to be received, or the settlement completion command to be received in Act 164 to Act 166.

Therefore, if the group customer who links and uses the two carts C01 and C02 touches the settlement button BT1 on the registration screen for linkage SC2 displayed on the touch panel 65 of the information terminal 60 provided in the cart C01, the screen of the touch panel 65 is switched from the registration screen for linkage SC2 to the settlement guidance screen SC3.

On the other hand, the settlement notification command is transmitted from the virtual POS server 30 to the information terminal 60B provided in the cart C02 as well.

If the settlement notification command is received, the processor 61 of the information terminal 60B in the waiting state in Act 108 to Act 113 determines YES in Act 113 and proceeds to Act 163 in FIG. 11. In Act 163, the processor 61 switches the screen of the touch panel 65 to the settlement guidance screen SC3.

A total amount and a settlement barcode of the shopping basket memory 322 are common in the settlement notification command received by the information terminal 60A provided in the cart C01 and the settlement notification command received by the information terminal 60B provided in the cart C02. Therefore, the settlement guidance screen SC3 is displayed not only on the information terminal 60A in which the settlement button BT1 is touched but also on the information terminal 60B provided in the cart C02 linked with the cart C01 in which the information terminal 60A is provided. The settlement guidance screens SC3 displayed on the touch panels 65 of the information terminal 60A and the information terminal 60B are screens on which the settlement barcode and the total amount are common, that is, screens on which the same settlement barcode BC1 and the same total amount are displayed.

Incidentally, a settlement flag of the cart memory 321A in which the cart ID set in the information terminal 60A is stored, is set to "1" according to the processing in Act 265 in FIG. 15. As a result, even if a registration operation for commodities is performed in the information terminal 60A, the registration operation is determined as an error according to the processing in Act 221 to Act 223 in FIG. 13. A settlement flag of the cart memory 321A in which the cart ID set in the information terminal 60B is stored, is also set to "1" according to the processing in Act 268 in FIG. 15. As a result, even if a registration operation for commodities is performed in the information terminal 60B, the registration operation is determined as an error. Therefore, after the settlement guidance screen SC3 is displayed, even if the group customer attempts to continuously purchase commodities, the group customer cannot register the commodities with the information terminal 60A and the information terminal 60B.

<Cancellation Operation for a Settlement Instruction>

Therefore, an operation for returning the information terminal 60A or the information terminal 60B to a commodity registerable state after the settlement guidance screen SC3 is displayed is explained.

If the group customer desires to return the information terminal 60A or the information terminal 60B to the commodity registerable state, the group customer touches the [return] button BT7 displayed on the settlement guidance screen SC3.

The processor 61 of the information terminal 60A or the information terminal 60B on which the settlement guidance screen SC3 is displayed is in the waiting state in Act 164 to Act 166. If the [return] button BT7 is detected as being touched in the waiting state, the processor 61 determines YES in Act 164 and proceeds to Act 167. In Act 167, the processor 61 controls the wireless unit 64 to output a settlement cancellation command to the virtual POS server 30. According to this control, the wireless unit 64 wirelessly transmits the settlement cancellation command. The settlement cancellation command is received by the access point 70 and transmitted to the virtual POS server 30 via the network 2. The settlement cancellation command includes the cart ID acquired in the processing in Act 103.

In Act 168, the processor 61, which controls the transmission of the settlement cancellation command, returns the screen of the touch panel 65 to a registration screen immediately before being switched to the settlement guidance screen SC3. That is, if the immediately preceding registration screen is the normal registration screen SC1, the processor 61 returns the screen of the touch panel 65 to the normal registration screen SC1. If the immediately preceding registration screen is the registration screen for linkage SC2, the processor 61 returns to the screen of the touch panel 65 to the registration screen for linkage SC2. Thereafter, the processor 61 returns to the waiting state in Act 108 to Act 113.

Figure 16:
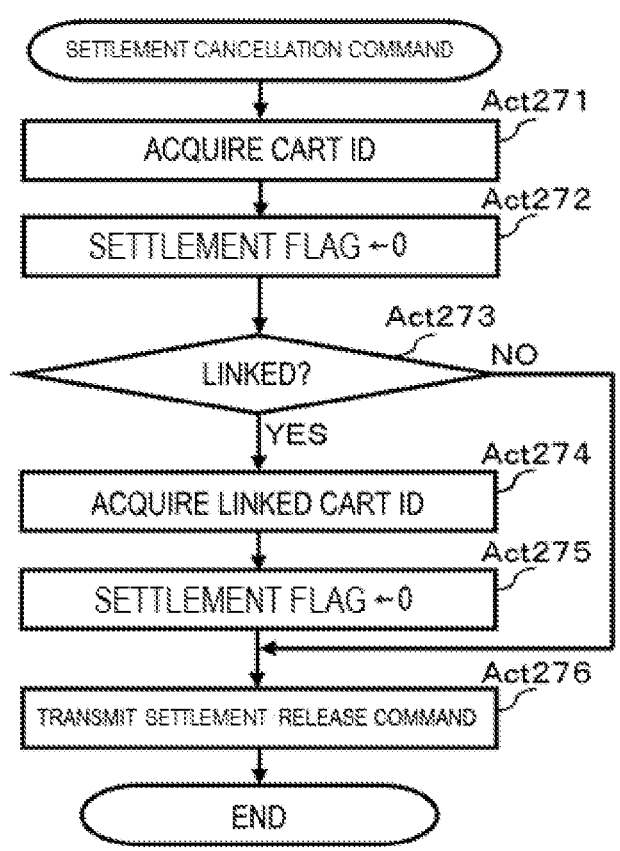
FIG. 16 is a flowchart illustrating a procedure of settlement cancellation command reception processing executed by the processor of the virtual POS server.
Figure 17:
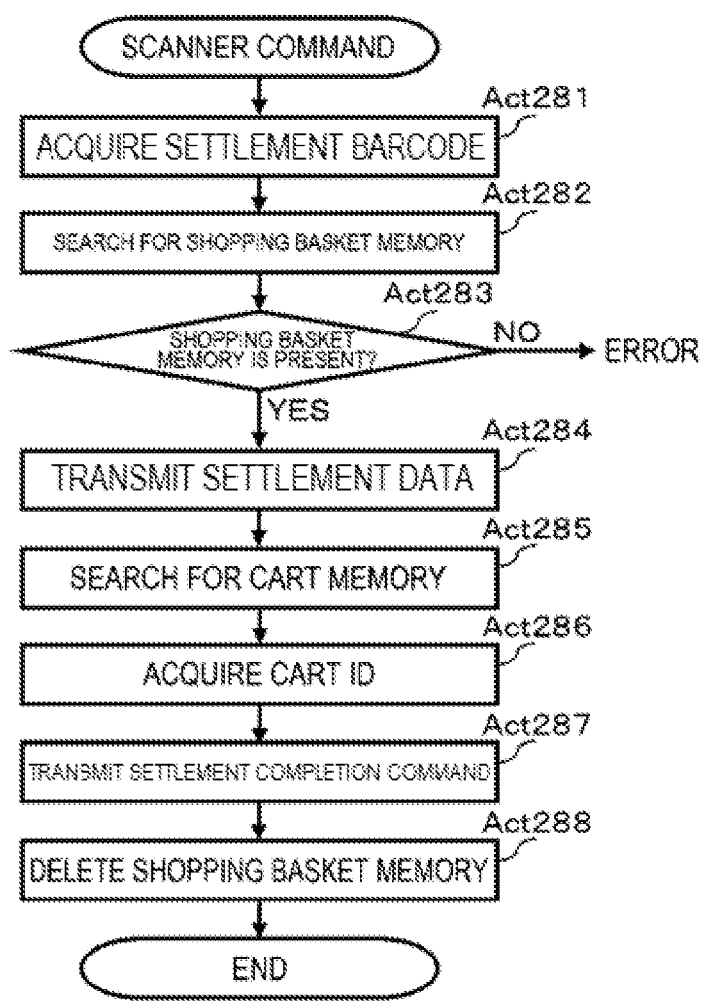
FIG. 17 is a flowchart illustrating a procedure of scanner command reception processing executed by the processor of the virtual POS server.

The processor 31 of the virtual POS server 30 that receives the settlement cancellation command starts command reception processing of the procedure illustrated in the flowchart of FIG. 16.

In Act 271, the processor 31 acquires a cart ID from the settlement cancellation command. In Act 272, the processor 31 resets the settlement flag of the cart memory 321 in which the cart ID is stored, to "0". In the following explanation, the cart memory 321 in which the cart ID acquired from the settlement cancellation command is stored, is represented as a cart memory 321J.

In Act 273, as in Act 223, the processor 31 determines, with a value of the number of linked carts n stored in the cart memory 321J, whether the cart C identified by the cart ID is in the linked state with the other cart C.

If the cart C is not in the linked state with the other cart C, the processor 31 skips processing in Act 274 and Act 275 explained below and proceeds to Act 276. In Act 276, the processor 31 controls the communication interface 34 to output a settlement release command addressed to the cart ID acquired from the settlement cancellation command. According to this control, the communication interface 34 transmits the settlement release command to the network 2. The settlement release command is wirelessly transmitted from the access point 70 via the network 2. The settlement release command is received by the information terminal 60 at the settlement cancellation command transmission source. The processor 31 ends the reception processing of the settlement cancellation command.

In Act 273, the processor 31 determines YES if the cart C and the other cart C are in the linked state and proceeds to Act 274. In Act 274, as in Act 267, the processor 31 acquires a linked cart ID. In Act 275, the processor 31 resets the member flag of the cart memory 321 in which the linked cart ID is stored, to "0". In the following explanation, the cart memory 321 in which the linked cart ID is stored, is represented as a cart memory 321K. If a plurality of cart memories 321K are present, the processor 31 acquires linked cart IDs from the respective cart memories 321K. The processor 31 resets settlement flags of the respective cart memories 321K to "0".

If ending the processing in Act 274 and Act 275, the processor 31 proceeds to Act 276 explained above. That is, the processor 31 controls the communication interface 34 to output a settlement release command addressed to the cart ID acquired from the settlement cancellation command. The processor 31 controls the communication interface 34 to output the settlement release command addressed to the one or the plurality of linked cart IDs acquired in the processing in Act 274. According to these kinds of processing, the communication interface 34 transmits the settlement release command addressed to the cart ID acquired from the settlement cancellation command and the settlement release command addressed to the linked cart IDs to the network 2. The settlement release commands are wirelessly transmitted from the access point 70 via the network 2. One settlement release command is received by the information terminal 60 at the settlement cancellation command transmission source. The other settlement release command is received by the information terminal 60 provided in another cart C that is in the linked state with the cart C in which the information terminal 60 is provided. The processor 31 ends the reception processing of the settlement cancellation command.

If the settlement release command is received, the processor 61 of the information terminal 60 in the waiting state in Act 164 to Act 166 determines YES in Act 165 and proceeds to Act 168 explained above. That is, the processor 61 returns the screen of the touch panel 65 to a registration screen immediately before being switched to the settlement guidance screen SC3. That is, if the immediately preceding registration screen is the normal registration screen SC1, the processor 61 returns the screen of the touch panel 65 to the normal registration screen SC1. If the immediately preceding registration screen is the registration screen for linkage SC2, the processor 61 returns the screen of the touch panel 65 to the registration screen for linkage SC2. Thereafter, the processor 61 returns to the waiting state in Act 108 to Act 113.

In this manner, for example, if the group customer using the cart C02 touches the [return] button BT7 of the settlement guidance screen SC3, the settlement flag of the cart memory 321B is switched from "1" to "0". The screen of the touch panel 65 in the information terminal 60B returns to the registration screen for linkage SC2. Therefore, the information terminal 60B returns to the commodity registerable state. The settlement flag of the cart memory 321A is also switched from "1" to "0". The screen of the touch panel 65 in the information terminal 60A returns to the immediately preceding registration screen for linkage SC2. Therefore, the information terminal 60A also returns to the commodity registerable state.

<Operation Related to Accounting>

The group customer finishing the shopping moves, together with the cart C01 or the cart C02, to a place where the settlement machine 50 is set. The group customer causes a scanner of the settlement machine 50 to read the settlement barcode BC1 of the settlement guidance screen SC3 displayed on the touch panel 65 of the information terminal 60A or the information terminal 60B. Then, a scanner command is transmitted from the settlement machine 50 to the virtual POS server 30. The scanner command includes data of the settlement barcode.

The processor 31 of the virtual POS server 30 that receives the scanner command starts the processing of the procedure illustrated in the flowchart of FIG. 17. In Act 281, the processor 31 acquires the data of the settlement barcode from the scanner command. In Act 282, the processor 31 searches for, with the data of the settlement barcode, a region where the shopping basket memory 322 is set up in the main memory 32. In Act 283, the processor 31 determines presence or absence of the shopping basket memory 322 in which the data of the settlement barcode is stored. In the following explanation, the shopping basket memory 322 in which the data of the settlement barcode acquired from the scanner command is stored, is represented as a shopping basket memory 322C.

If the shopping basket memory 322C is absent, the processor 31 determines NO in Act 283 and determines that input of the scanner command is an error. If the input of the scanner command is an error, the error is informed in the settlement machine 50. The customer confirming the error performs the scanning of the settlement barcode again.

If the shopping basket memory 322C is present, the processor 31 determines YES in Act 283 and proceeds to Act 284. In Act 284, the processor 31 controls the communication interface 34 to output data of commodity to be purchased, a discount total amount, and a total amount stored in the shopping basket memory 322C to the settlement machine 50 at the scanner command transmission source as settlement data necessary for settlement processing. According to this control, the communication interface 34 transmits the accounting data to the network 2. The settlement data is transmitted to the settlement machine 50 at the scanner command transmission source and the settlement processing is executed. The settlement processing is well-known processing in the settlement machine 50. Therefore, explanation of the settlement processing is omitted for sake of brevity.

In Act 285, the processor 31, which controls the transmission of the settlement data, searches for, with a member ID stored in the shopping basket memory 322C, a region where the cart memory 321 is set up in the main memory 32. In Act 286, the processor 31 acquires a cart ID from the cart memory 321 in which the member ID is stored. In the following explanation, the cart memory 321 in which the member ID stored in the shopping basket memory 322C is stored, is represented as a cart memory 321L. If a plurality of cart memories 321L are detected, the processor 31 acquires cart IDs from the respective cart memories 321L.

In Act 287, the processor 31 controls the communication interface 34 to output a settlement completion command addressed to the cart ID acquired in the processing in Act 286. According to this control, the communication interface 34 transmits one or a plurality of settlement completion commands to the network 2. The settlement completion commands are wirelessly transmitted from the access point 70 via the network 2. One settlement completion command is received by the information terminal 60 at the settlement command transmission source. The other linkage commands are received by the information terminal 60 provided in another cart C that is in the linked state with the cart C in which the information terminal 60 is provided. In Act 288, the processor 31 deletes the shopping basket memory 322C. The processor 31 ends the reception processing of the scanner command.

With reference again to FIG. 11, if the settlement completion command is received, the processor 61 in the waiting state in Act 164 to Act 166 determines YES in Act 166 and proceeds to Act 167. The processor 61 performs logout in Act 167. Upon performing the logout, the processor 61 ends the information processing executed by the terminal program.

The explanation related to the main operation of the cart POS system 1 is finished.

The processor 31 of the virtual POS server 30 executes the processing in Act 201 to Act 214 in FIG. 12 in cooperation with the main memory 32 to function as a first storing section that stores, in association with the cart ID for identifying the information terminal 60, purchaser identification information accepted by the purchaser accepting section of the information terminal 60, that is, a member ID.

The processor 31 executes the processing in Act 221 to Act 231 in FIG. 13 in cooperation with the main memory 32 to function as a second storing section that stores, in association with the member ID stored by the first storing section in association with the cart ID of the information terminal 60, data related to commodities to be purchased accepted by the commodity accepting section of the information terminal 60.

The processor 31 executes the processing in Act 232 to Act 235 in FIG. 13 to function as an output section that outputs data related to commodities to be purchased stored by the second storing section in association with a member ID to the information terminal 60 identified by the cart ID stored by the first storing section in association with the member ID. If there are a plurality of cart IDs stored by the first storing section in association with the member ID, the output section outputs the data related to the commodities to be purchased to a plurality of information terminals 60 respectively identified by the plurality of cart IDs. In detail, the output section outputs the data related to the commodities to be purchased to the plurality of information terminals

60 respectively identified by the plurality of cart IDs such that the information terminals 60 that accept the data related to the commodities to be purchased can be identified by the linked cart numbers k.

The processor 31 executes the processing in Act 221 to Act 223 in FIG. 13 and the processing in Act 266 to Act 268 in FIG. 15 to function as a disabling section that issues a disabling command to another information terminal that has a purchaser accepting section configured to accept the member ID stored by the first storing section in association with the cart ID of the information terminal 60. The disabling command is issued in response to acceptance of a settlement declaration by the settlement accepting section of the information terminal 60, for the other information terminal 60 to disable the commodity accepting section thereof.

The processor 31 executes the processing in Act 273 to Act 275 in FIG. 16 to function as a releasing section that issues a releasing command to the other information terminal 60 to release the disabled state of the commodity accepting section in the other information terminal 60, if release of the disabled state is commanded from the information terminal 60 or the other information terminal 60 after the commodity accepting section of the other information terminal 60 has been disabled.

The processor 31 executes the processing in Act 229 to Act 231 in FIG. 13 to function as a totaling section that calculates a total amount of the commodities from the data related to the commodities to be purchased stored by the second storing section and further calculates an amount obtained by subtracting a discount amount from the total amount if a discount is included from the data related to the commodities to be purchased.

With such a virtual POS server 30 including the communication section, the first storing section, the second storing section, and the disabling section, if a settlement instruction is performed from the information terminal 60 used by the customer visiting the store in a group, it is possible to prohibit commodity registration from the information terminals 60 used by the other members of the same group.

Since the virtual POS server 30 further includes the output section, if the customer visiting the store in a group performs registration of commodities using the plurality of information terminals 60, in the information terminals 60, information concerning the commodities including information concerning commodities registered in the information terminals 60 used by the other members is collectively displayed on one screen. Moreover, the customer can easily identify, from the information on the screen, in which information terminals 60 the commodities are registered.

Since the virtual POS server 30 further includes a releasing section, even if commodity registration cannot be temporarily performed because a settlement instruction is performed in another information terminal 60, it is possible to easily return the information terminal 60 to the commodity registerable state with simple operation on the information terminal 60.

Since the virtual POS server 30 further includes the totaling section, even if the customer visiting the store in a group uses the plurality of information terminals 60, the user can receive a service of a set discount in the same manner as when the user independently uses the information terminal 60.

In the embodiment explained above, if a settlement instruction is performed from the information terminal used by the customer visiting the store in a group, the purchase support device can prohibit commodity registration from the information terminals used by the other members of the same group. However, such an embodiment is not limited to this.

In the example explained in the embodiment, the information terminal 60 is provided in the conveying body that conveys commodities purchased by the purchaser, that is, the cart C. There is an advantage that the information terminal 60 is easily handled by providing the information terminal 60 in the cart C. However, the information terminal 60 does not always have to be provided in the conveying body such as the cart C. A portable electronic device such as a smartphone or a wearable computer may be used as the information terminal 60. In this case, the customer carries and uses the information terminal.

In the example explained above, the linked cart number is displayed together with the data related to the commodities to be purchased in order to make it possible to identify the information terminal 60 that receives the data related to the commodities to be purchased. Means for making it possible to identify the information terminal 60 are not limited to the display of the linked cart number. For example, a mark associated with the linked cart number may be displayed to make it possible to identify the information terminal 60. Alternatively, every time the linked cart number is varied, a display color of the data related to the commodities to be purchased may be changed to make it possible to identify the information terminal 60.

In the embodiment, the commodity data is stored in one shopping basket memory 322B not only when the commodity registration command transmitted from the information terminal 60A is received but also when the commodity registration command transmitted from the information terminal 60B is received. Concerning this point, if the commodity registration command transmitted from the information terminal 60A is received, the commodity data may be stored in one shopping basket memory. If the commodity registration command transmitted from the information terminal 60B is received, the commodity data may be stored in another one shopping basket memory. Even in that case, the commodity accepting section of the information terminal 60 only has to be disabled according to, for example, the settlement declaration performed in the information terminal 60A.

In the example explained in this embodiment, the virtual POS server 30 is the purchase support device. In another example, the store server 10 may be the purchase support device. Alternatively, it is also possible to configure the purchase support device with a system including a plurality of servers, for example, distribute the functions of the purchase support device to the virtual POS server 30 and the store server 10.

In the example explained in the embodiment, the control program is stored in advance in the main memory 32 or the auxiliary storage device 33 of the virtual POS server 30. Concerning this point, the purchase support device may be configured in a state in which the control program is not stored in the main memory 32 or the auxiliary storage device 33. In that case, the control program transferred separately from the purchase support device only has to be written in a writable storage device included in the purchase support device according to operation of a user or the like. The transfer of the control program can be performed by recording the control program in a removable recording medium or can be performed by communication via a network. A form of the recording medium may be any form if the recording medium can store computer programs like a CD-ROM, a memory card, or the like and can be read by a device.

The several embodiments are explained above. However, the embodiments are presented as examples and are not intended to limit the scope of the invention. These new embodiments can be implemented in other various forms. Various omissions, substitutions, and changes can be made without departing from the spirit of the invention. These embodiments and modifications of the embodiments are included in the scope and the gist of the invention and included in the inventions described in claims and the scope of equivalents of the inventions.

What is claimed is:

1. A point-of-sale (POS) system comprising:
a plurality of carts, each identified with a cart ID and equipped with an information terminal, a scanner, and a card reader;
a plurality of settlement machines; and
a server configured to perform communication with the information terminals to manage a commodity registration process and a settlement process for a group of carts that are linked to each other, wherein
each of the information terminals is configured to
acquire purchaser identification information for identifying a purchaser through the card reader and communicate the acquired purchaser identification information together with a cart ID of the cart on which the information terminal is mounted, to the server,
acquire data related to commodities that have been registered to be purchased through the scanner and communicate the acquired data related to the commodities registered to be purchased together with the cart ID, to the server, and
display a user interface that includes an item that is selectable to communicate a settlement declaration to the server together with the cart ID, to initiate settlement of the commodities registered to be purchased, and upon receiving a settlement notification from the server, display a settlement guidance screen including a settlement barcode that is readable by any one of the settlement machines to complete settlement of the commodities registered to be purchased, and
the server includes:
a communication section through which the purchaser identification information along with a first cart ID, the data related to the commodities registered to be purchased along with a second cart ID, and the settlement declaration along with a third cart ID, are received from the information terminals, and through which the settlement notification is transmitted to the information terminals, and
a processor configured to (i) upon receiving the purchaser identification information along with the first cart ID, store the purchaser identification information in a first memory region in association with the first cart ID, wherein a group of carts having cart IDs associated with the same purchaser identification information are linked to each other for commodity registration and settlement, (ii) upon receiving the data related to the commodities registered to be purchased along with the second cart ID, determine a purchaser identification information corresponding to the second cart ID by looking up the association in the first memory region and store the data related to the commodities registered to be purchased in a second memory region in association with the determined purchaser identification information, and (iii) upon receiving the settlement declaration along with the third cart ID, determine a purchaser identification information corresponding to the third cart ID by looking up the association in the first memory region, generate the settlement notification including the settlement barcode, wherein the settlement barcode is associated with the data related to the commodities registered to be purchased, which are stored in the second memory region in association with the determined purchaser identification information, and transmit through the communication section the settlement notification to the information terminals of the carts having cart IDs stored in the first storage region in association with the determined purchaser identification information.

2. The POS system according to claim 1, wherein the processor is further configured to transmit through the communication section the data related to the commodities registered to be purchased, which are stored in the second memory region in association with the purchaser identification information to each of the plurality of information terminals of carts having cart IDs stored in the first storage region in association with the same purchaser identification, and upon receipt of the data related to the commodities registered to be purchased, each of the plurality of information terminals displays the data related to the commodities registered to be purchased on a commodity registration screen.

3. The POS system according to claim 1, wherein the processor is further configured to, after transmitting the settlement notification to the information terminals, issue a release command to the information terminals to display the commodity registration screen in place of the settlement guidance screen if one of the information terminals cancels the initiated settlement.

4. The POS system according to claim 1, wherein each of the plurality of carts further includes a camera positioned to capture an image of a basket area of the cart in which the commodities that have been registered are placed.

5. The POS system according to claim 1, wherein each of the plurality of carts further includes a lamp that is controlled to be lit in one of a plurality of colors by the information terminal mounted on the cart.

6. The POS system according to claim 5, wherein the lamps of the carts that are in the same group are lit in the same color.

* * * * *

UNITED STATES PATENT AND TRADEMARK OFFICE
CERTIFICATE OF CORRECTION

| | | |
|---|---|---|
| PATENT NO. | : 11,257,056 B2 | Page 1 of 1 |
| APPLICATION NO. | : 16/742316 | |
| DATED | : February 22, 2022 | |
| INVENTOR(S) | : Haruki Mori | |

It is certified that error appears in the above-identified patent and that said Letters Patent is hereby corrected as shown below:

In the Claims

Column 32, Line 38, please replace "claim 1" with --claim 2--.

Signed and Sealed this
Twenty-second Day of November, 2022

Katherine Kelly Vidal
*Director of the United States Patent and Trademark Office*